United States Patent
Sugai

(10) Patent No.: US 7,815,724 B2
(45) Date of Patent: Oct. 19, 2010

(54) INK COMPOSITION

(75) Inventor: Masaharu Sugai, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 39 days.

(21) Appl. No.: 11/434,898

(22) Filed: May 17, 2006

(65) Prior Publication Data

US 2006/0269675 A1    Nov. 30, 2006

(30) Foreign Application Priority Data

May 24, 2005    (JP) .............................. 2005-151473

(51) Int. Cl.
*C09D 11/00*    (2006.01)
*G03F 7/00*    (2006.01)
*G03F 7/26*    (2006.01)
*G03C 1/00*    (2006.01)

(52) U.S. Cl. ................. 106/31.6; 106/31.13; 430/286.1; 430/300; 430/302

(58) Field of Classification Search .............. 430/286.1, 430/269, 281.1, 300, 302; 106/31.13, 31.6; 524/1, 182

See application file for complete search history.

(56) References Cited

U.S. PATENT DOCUMENTS

| | | | | |
|---|---|---|---|---|
| 3,759,711 | A * | 9/1973 | Rauner | 430/165 |
| 4,362,809 | A * | 12/1982 | Chen et al. | 430/312 |
| 6,476,092 | B1 * | 11/2002 | Kunita | 522/31 |
| 7,041,846 | B2 * | 5/2006 | Watanabe et al. | 560/128 |
| 2003/0057610 | A1 * | 3/2003 | Kunita et al. | 264/401 |
| 2005/0048402 | A1 * | 3/2005 | Mizutani et al. | 430/281.1 |

FOREIGN PATENT DOCUMENTS

| | | | |
|---|---|---|---|
| JP | 2003-171420 | * | 6/2003 |
| JP | 2003-192943 |   | 7/2003 |

OTHER PUBLICATIONS

Takahashi. "Evaluation of chemically amplified resist based on adamantyl methacrylate for 193 nm lithography." SPIE vol. 2438. pp. 422-432.*

Tsuda. Thermally Stable Cyclopolymer from the Ether Dimer of Adamantyl alpha-Hydroxymethylacrylate. Macromolecules 1993, 26, pp. 4734-4735.*

* cited by examiner

*Primary Examiner*—C. Melissa Koslow
*Assistant Examiner*—Matthew E Hoban
(74) *Attorney, Agent, or Firm*—Sughrue Mion, PLLC

(57) ABSTRACT

An ink composition containing an α-hetero atom-containing methacrylic compound represented by the following general formula (I) as a polymerizable compound and a polymerization initiator (b):

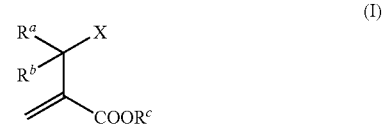

(I)

wherein $R^a$ and $R^b$ each independently represent a hydrogen atom, a halogen atom, a cyano group or an organic group; X represents a group bonded to the α-carbon through a hetero atom, or a halogen atom; and $R^c$ represents a secondary or tertiary hydrocarbon group having not less than 7 carbon atoms and including a ring structure, provided that X and $R^c$, $R^a$ and $R^b$, or X and $R^a$ or $R^b$ may be linked together to form a ring structure.

6 Claims, No Drawings

INK COMPOSITION

TECHNICAL FIELD

The present invention relates to an ink composition and, in particular, a radiation-curable ink jet-recording ink composition, which has high sensitivity and is excellent in the adhesion to a substrate and storage stability and thus permits the formation of a high quality image as well as an ink jet-recording method using the ink composition and printed matters obtained using the same. The present invention likewise relates to an original for forming a lithographic printing plate, which is free of any developing treatment, can ensure high printing durability and permits the formation of high quality images, and a method for the preparation thereof.

BACKGROUND ART

As the image-recording methods in which images are formed on a medium to be recorded (or a recording medium) such as paper on the basis of image data signals, there have been known, for instance, the electrophotogaphy technique, the sublimation-type and melt-type thermal ink-transfer techniques, and the ink jet-recording technique. The electrophotogaphy technique requires the use of a process for forming an electrostatic latent image on a drum made of a light-sensitive material through charging and light-exposure operations and therefore, this technique suffers from various problems. For instance, the technique requires the use of a complicated system and this in turn results in an increase in the production cost. In addition, the device used in the thermal ink-transfer technique is rather cheap, but this technique suffers from problems in that the technique requires the use of an ink ribbon, this in turn leads to an increase in the running cost and the generation of a large amount of waste matter. On the other hand, the ink jet-recording technique uses a cheap device and is a technique in which images are directly formed on a recording medium by discharging ink only on the desired image area. Accordingly, this technique permits the efficient use of the ink and requires a reduced running cost. Furthermore, this technique is less noisy and therefore, it is quite excellent as an image-recording technique.

As an example of such an ink jet recording technique, there has been known a recording technique which makes use of an ink jet-recording ink capable of being cured through the irradiation thereof with radiant rays.

For instance, such an ink jet-recording technique using an ultraviolet ray-curable ink jet-recording ink has attracted special interest lately since this technique may give out a relatively small quantity of bad smells, is excellent in the quick drying ability and permits the recording of images even on a recording medium free of any ink absorbability. There has been proposed, in the following Patent Document 1, a composition comprising a polymerizable compound selected from the group consisting of specific acrylate compounds and a coloring material for the purpose of providing a highly safe ink jet-recording ink, which can record images even on a substrate whose direct recording of images according to the ink jet-recording technique has in general been believed to be considerably difficult, without causing any bleeding, while ensuring high sensitivity and high adhesion to a recording medium and which has only a reduced skin-irritating effect and/or only a slight sensitization.

Patent Document 1: Japanese Un-Examined Patent Publication (hereunder referred to as "J.P. KOKAI") 2003-192943

DISCLOSURE OF THE INVENTION

The ink jet-recording ink capable of being cured through the irradiation thereof with radiant rays such as ultraviolet light rays (radiation-curable ink jet-recording ink) should not only have sufficiently high sensitivity, but also provide high quality images. A variety of advantages can be obtained by the development of a radiation-curable ink jet-recording ink having high sensitivity. For instance, a high curing ability is imparted to the resulting ink, the electric power consumption of the ink jet-recording can be reduced, the service life of a source of radiant rays is improved through the reduction of the load to be applied thereto and the generation of any low molecular weight substances due to any insufficient curing of the ink can be prevented. Moreover, the improvement of the sensitivity leads to the improvement of the strength of the cured images, in particular, when the ink jet-recording ink is used as the image area of a lithographic printing plate and this in turn results in the formation of such a printing plate having high printing durability.

On the other hand, to obtain high quality images, the ink jet-recording ink should satisfy the following requirements: the ink particles ejected on the surface of a recording medium should maintain their shape (uncrushable) even after the ejection thereof, and the ink particles never undergo any deformation (free of any bleeding and/or penetration) on the surface of the recording medium till the ink particles ejected in a predetermined pattern or shape are cured by the radiant rays and fixed thereon.

However, any conventional technique including that disclosed in the foregoing Patent Document 1 has not yet provided any radiation-curable ink jet-recording ink having satisfactory sensitivity and sufficient for providing high quality images.

Accordingly, it is an object of the present invention to provide an ink composition and, in particular, a radiation-curable ink jet-recording ink composition, which has high sensitivity to the irradiation with radiant rays, permits the formation of a high quality image and is excellent in the storage stability as well as an ink jet-recording method using the ink composition and printed matters obtained using the same.

It is another object of the present invention to provide a method for the preparation of a lithographic printing plate, which is free of any developing treatment, can ensure the formation of a lithographic printing plate having high printing durability and permits the formation of high quality images and a lithographic printing plate prepared by the method.

The foregoing objects of the present invention can be accomplished by providing an ink composition comprising an α-hetero atom-containing methacrylic compound represented by the following general formula (I) as a polymerizable compound (a) and a polymerization initiator (b).

Preferably, the foregoing ink composition additionally comprises a coloring material (c). In this respect, the coloring material (c) is preferably a pigment or an oil-soluble dye.

In a preferred embodiment of the present invention, the ink composition is an ink jet-recording ink composition.

Moreover, the present invention herein provides an ink jet-recording method which comprises the steps of ejecting the foregoing ink composition to place it on a recording medium and irradiating the ink composition with radiant rays to thus make the ink composition cure.

Moreover, the present invention likewise provides a printed matter obtained by ejecting the foregoing ink composition to place it on a recording medium and then irradiating the ink composition with radiant rays to thus make the ink composition cure.

Further, the present invention also provides a method for the preparation of a lithographic printing plate which comprises the steps of ejecting the foregoing ink composition to place it on a hydrophilic substrate (or to impact the ink composition on the substrate) and then irradiating the ink composition with radiant rays to thus form a hydrophobic area on the substrate.

The present invention likewise provides a lithographic printing plate having hydrophobic areas formed by ejecting the foregoing ink composition to place it on a hydrophilic substrate and then irradiating the ink composition with radiant rays to thus make the ink composition cure.

The α-hetero atom-containing methacrylic compound shows lower thermal polymerizability in the absence of polymerization initiator as compared with the acrylic compound and therefore, the former compound is excellent in the storage stability.

Accordingly, the present invention herein provides a radiation-curable ink jet-recording ink composition, which has high sensitivity to the irradiation with radiant rays, permits the formation of a high quality image and is excellent in the storage stability as well as a method for the preparation of a lithographic printing plate, which is free of any developing treatment, can ensure the formation of images or a lithographic printing plate having high printing durability and permits the formation of high quality images.

According to the present invention, it would be possible to obtain an ink composition which is highly sensitive, has good adhesion to a substrate and a recording medium such as paper and permits the formation of high quality images.

The ink composition comprising a specific α-hetero atom-containing methacrylic compound, according to the present invention possesses considerably high susceptibility to curing as compared with the ink composition which comprises an acrylic compound as disclosed in Patent Document 1. The reason for this would be considered to be as follows: the α-hetero atom-containing methacrylic compound has polymerizability higher than that observed for the acrylic compound, the former is less sensitive to the polymerization-inhibitory effect of oxygen as compared with the latter, the former may, as a result, be improved in the ability to be cured by the irradiation with ultraviolet rays or an electron beam and the former has conspicuous curing characteristics, in particular, when curing the same through the irradiation with ultraviolet rays, which is carried out in the atmosphere. Alternatively, the reason why the polymerizability is improved would likewise be because the polymerization-termination rate is reduced through the introduction of a bulky substituent such as a tertiary alkyl group having a ring structure into the molecule of the α-hetero atom-containing methacrylic compound.

Moreover, the lithographic printing plate, which makes use of the ink composition of the present invention would greatly be improved in the strength of the cured image area and likewise improved in the adhesion between the image area and the surface of a substrate as compared with the conventional lithographic printing plate. The reason for this would be as follows: the α-hetero atom-containing methacrylic compound shows the self-coagulation properties after its curing, the strength of the cured images is increased, this results in the occurrence of a strong chemical interaction such as the chelation of the α-hetero atom-containing methacrylic compound with atoms present on the surface of the substrate and the adhesion to the substrate is thus improved.

BEST MODE FOR CARRYING OUT THE INVENTION (1) Ink Composition

The ink composition of the present invention comprises an a polymerizable compound represented by the following general formula (I) and a polymerization initiator. Preferably, the ink composition of the present invention further comprises a coloring material.

In addition, the ink composition of the present invention is preferably one capable of being cured by the irradiation with radiant rays. The term "radiant rays (radiation)" used herein means wide variety of radiations such as α-beams, γ-beams, X-rays, ultraviolet light rays, visible light rays and electron beams, but preferably used herein are ultraviolet light rays and electron beams among others and in particular, the use of ultraviolet light rays is more preferred.

(1-1) [Polymerizable Compound]

One of the characteristic properties of the ink composition of the present invention is that it comprises an α-hetero atom-containing methacrylic compound represented by the following general formula (I) as a polymerizable compound:

In the formula (I), $R^a$ and $R^b$ each independently represent a hydrogen atom, a halogen atom, a cyano group or an organic group; X represents a group bonded to the α-carbon through a hetero atom, or a halogen atom; and $R^c$ represents a secondary or tertiary hydrocarbon group having not less than 7 carbon atoms and comprising a ring structure. In this respect, X and $R^c$, $R^a$ and $R^b$, or X and $R^a$ or $R^b$ may be linked together to thus form a ring structure.

The structure represented by the general formula (I) may be a monovalent or divalent or a higher-valent substituent, or all of the substituents $R^a$, $R^b$, $R^c$ and X may represent terminal groups to thus form a complete compound. In case where the structure represented by the general formula (I) is a monovalent or divalent or a higher-valent substituent, at least one of the substituents $R^a$, $R^b$, $R^c$ and X has at least one valence (bonding arm). Moreover, $R^c$ and X may serve as a connecting group having n connectable sites and n groups represented by the general formula (I) may be linked to the terminals thereof (n is an integer of not less than 2) (multimer).

Further, the compound of Formula (I) may be linked to a polymer chain at the position of one or both of $R^c$ and X. More specifically, the compound may be in the form of a polymer chain in which the structures each represented by Formula (I) are present on side chains thereof. In this connection, the polymer chain may be, for instance, a linear organic high molecular weight polymer. Specific examples thereof are polyurethane, novolak resin, vinylic polymers such as polyvinyl alcohol, poly(hydroxy styrene), polystyrene, poly (meth)acrylic acid esters, poly(meth)acrylic acid amides and polyacetal. These polymers may be homopolymers or copolymers.

In Formula (I), X represents a group bonded to the α-carbon through a hetero atom, or a halogen atom, and $R^e$ represents a secondary or tertiary hydrocarbon group having not less than 7 carbon atoms and comprising a ring structure, but they may be terminal groups, or may form a connecting group, or may be connected to another substituent (in this respect, the substituent also includes, for instance, the structure represented by Formula (I) or a polymer chain as has been described above).

The compounds represented by the foregoing formula (I) are preferably polymerizable compounds represented by the following general formulas (II) to (IV) and each comprising an α-hetero atom-containing methacrylic structure and at least one polymerizable group.

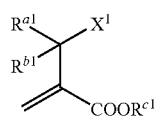
(II)

In Formula (II), $R^{a1}$ and $R^{b1}$ each independently represents a hydrogen atom, a halogen atom, a cyano group or a monovalent organic group; $X^1$ represents a monovalent group bonded to the α-carbon through a hetero atom, or a halogen atom; and $R^{c1}$ represents a linear or cyclic, secondary or tertiary monovalent hydrocarbon group having not less than 7 carbon atoms. In this respect, $X^1$ and $R^{c1}$, $R^{a1}$ and $R^{b1}$, or $X^1$ and $R^{a1}$ or $R^{b1}$ may be linked together to thus form a ring structure.

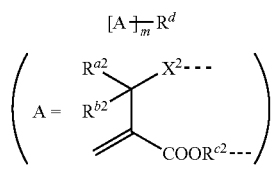
(III)

In Formula (III), m represents an integer ranging from 2 to 6, $R^{a2}$ and $R^{b2}$ each independently represents a hydrogen atom, a halogen atom, a cyano group or a monovalent organic group; $X^2$ represents a halogen atom, a monovalent or a divalent group bonded to the α-carbon through a hetero atom, or a divalent hetero atom; $R^{c2}$ represents a linear or cyclic, secondary or tertiary, monovalent or divalent hydrocarbon group having not less than 7 carbon atoms; and $R^d$ represents a divalent to hexa-valent hydrocarbon group, provided that at least one of $X^2$ and $R^{c2}$ represents a divalent group. The dotted line represents a valency when there is a linkage between $X^2$ or $R^{c2}$ and $R^d$ and the number of valences present in the structure of Formula (III) ranges from 2 to 6 in total. Further, $X^2$ and $R^{c2}$, $R^{a2}$ and $R^{b2}$, or $X^2$ and $R^{a2}$ or $R^{b2}$ may be linked together to thus form a ring structure.

More preferred compounds represented by Formula (III) are those represented by the following general formula (III-1) or (III-2):

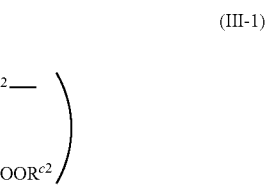

In Formula (III-1) or (III-2), m represents an integer ranging from 2 to 6, and $R^{a2}$, $R^{b2}$, $X^2$, $R^{c2}$ and $R^d$ are the same as those defined above in connection with Formula (III).

Preferred examples of $R^d$ appearing in Formula (III-1) are those listed below:

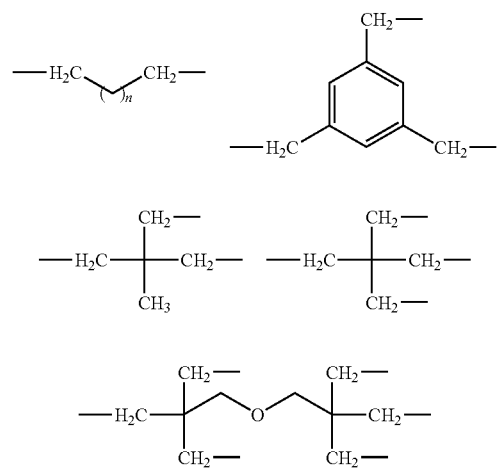

Preferred examples of $R^d$ appearing in Formula (III-2) are those listed below:

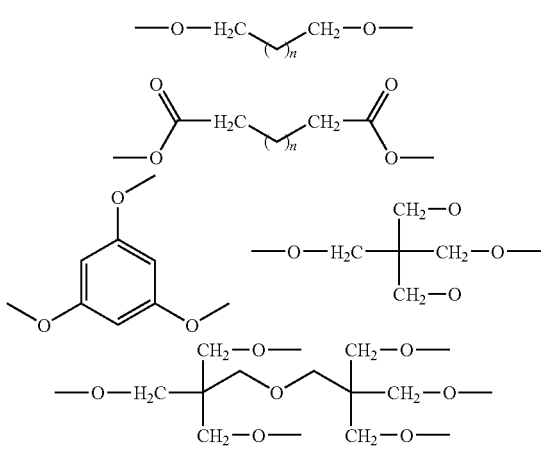

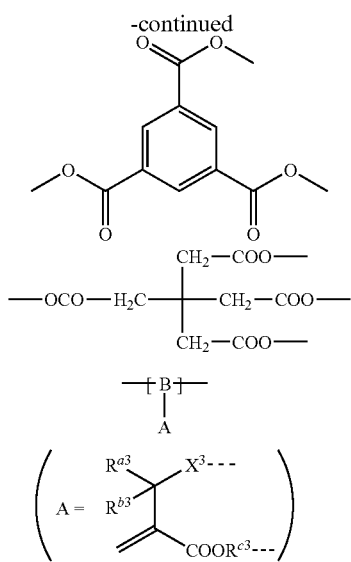

In Formula (IV), B represents a repeating unit of a polymer chain, and in Formula A, $R^{a3}$ and $R^{b3}$ each independently represents a hydrogen atom, a halogen atom, a cyano group or a monovalent organic group; $X^3$ represents a halogen atom, a monovalent group or a divalent group bonded to the α-carbon through a hetero atom, or a divalent hetero atom; and $R^{c3}$ represents a linear or cyclic, secondary or tertiary, monovalent or divalent hydrocarbon group having not less than 7 carbon atoms, provided that at least one of $X^3$ and $R^{c3}$ represents a divalent group. The dotted line represents a number of valences which may vary depending on the valence numbers of $X^3$ and $R^{c3}$ and $R^d$. Further, $X^3$ and $R^{c3}$, $R^{a3}$ and $R^{b3}$, or $X^3$ and $R^{a3}$ or $R^{b3}$ may be linked together to thus form a ring structure.

In Formula (IV), B represents a repeating unit of a polymer chain. Such a polymer chain may be, for instance, a linear organic high molecular weight polymer. Specific examples thereof include polyurethane, novolak resin, vinylic polymers such as polyvinyl alcohol, poly(hydroxy styrene), polystyrene, poly(meth)acrylic acid esters, poly(meth)acrylic acid amides and polyacetal. These polymers may be homopolymers or copolymers.

In the foregoing general formulas (I) to (IV), the "hetero atom" may preferably be non-metallic atom and more specifically, it may be, for instance, an oxygen, sulfur, nitrogen or phosphorus atom. The "group bonded to the α-carbon through a hetero atom" or the "monovalent group bonded to the α-carbon through a hetero atom" may be, for instance, a hydroxyl group, a hetero ring-containing group (provided that this group is linked at the hetero atom), a substituted oxy group, a mercapto group, a substituted thio group, an amino group, a substituted amino group, a sulfo group, a sulfonate group, a substituted sulfinyl group, a substituted sulfonyl group, a phosphono group, a substituted phosphono group, a phosphonate group, a substituted phosphonate group or a nitro group. The "divalent or higher-valent group bonded to the α-carbon through a hetero atom" may be one derived from the foregoing monovalent group in which one or more hydrogen atoms or other atoms or groups are replaced with a bonding arm or arms.

In the foregoing general formulas (I) to (IV), the "organic group" or "monovalent organic group" means, for instance, a hydrocarbon group which may have a substituent and which may have an unsaturated bond, a substituted oxy group, a substituted thio group, a substituted amino group, a substituted carbonyl group, or a carboxylate group. The "divalent organic group" or "divalent or higher-valent organic group" may be one derived from the monovalent organic group in which one or more hydrogen atoms or other atoms or groups are replaced with a bonding arm or arms.

In this specification, examples of "monovalent hydrocarbon group" include alkyl groups, substituted alkyl groups, aryl groups, substituted aryl groups, alkenyl groups, substituted alkenyl groups, alkynyl groups and substituted alkynyl groups.

The alkyl group may be, for instance, linear, branched or cyclic alkyl groups having 1 to 20 carbon atoms and specific examples thereof are methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, 2-methylhexyl, cyclohexyl, cyclopentyl, and 2-norbornyl groups. Among these, more preferably used herein are linear alkyl groups having 1 to 12 carbon atoms, branched alkyl groups having 3 to 12 carbon atoms, and cyclic alkyl groups having 5 to 10 carbon atoms.

The substituted alkyl group is constituted by bonding a substituent with an alkylene group and such a substituent may be a monovalent non-metallic atomic group other than hydrogen atom and examples thereof preferably used herein are halogen atoms (such as —F, —Br, —Cl, —I), hydroxyl group, alkoxy groups, aryloxy groups, mercapto groups, alkylthio groups, arylthio groups, alkyl dithio groups, aryl dithio groups, amino groups, N-alkylamino groups, N,N-dialkylamino groups, N-arylamino groups, N,N-diarylamino groups, N-alkyl-N-arylamino groups, acyloxy groups, carbamoyloxy groups, N-alkyl carbamoyloxy groups, N-aryl carbamoyloxy groups, N,N-dialkyl carbamoyloxy groups, N,N-diaryl carbamoyloxy groups, N-alkyl-N-aryl carbamoyloxy groups, alkylsulfoxy groups, arylsulfoxy groups, acylthio groups, acylamino groups, N-alkyl-acylamino groups, N-aryl-acylamino groups, ureido group, N'-alkyl-ureido groups, N',N'-dialkyl-ureido groups, N'-aryl-ureido groups, N',N'-diaryl-ureido groups, N'-alkyl-N'-aryl ureido groups, N-alkyl-ureido groups, N-aryl-ureido groups, N'-alkyl-N-alkyl ureido groups, N'-alkyl-N-aryl ureido groups, N',N'-dialkyl-N-alkyl-ureido groups, N',N'-dialkyl-N-aryl-ureido groups, N'-aryl-N-alkyl ureido groups, N'-aryl-N-aryl ureido groups, N',N'-diaryl-N-alkyl-ureido groups, N',N'-diaryl-N-aryl-ureido groups, N'-alkyl-N'-aryl-N-alkyl ureido groups, N'-alkyl-N'-aryl-N-aryl ureido groups, alkoxy-carbonylamino groups, aryloxy-carbonylamino groups, N-alkyl-N-alkoxy-carbonylamino groups, N-alkyl-N-aryloxy-carbonylamino groups, N-aryl-N-alkoxy-carbonylamino groups, N-aryl-N-aryloxy-carbonylamino groups, formyl groups, acyl groups, carboxyl groups and conjugated base groups thereof (hereunder referred to as "carboxylate(s)"), alkoxycarbonyl groups, aryloxycarbonyl groups, carbamoyl groups, N-alkyl-carbamoyl groups, N,N-dialkyl-carbamoyl groups, N-aryl-carbamoyl groups, N,N-diaryl-carbamoyl groups, N-alkyl-N-aryl-carbamoyl groups, alkylsulfinyl groups, arylsulfinyl groups, alkylsulfonyl groups, arylsulfonyl groups, sulfo group (—$SO_3H$) and conjugated base groups thereof (hereunder referred to as "sulfonate group(s)"), alkoxy-sulfonyl groups, aryloxy-sulfonyl groups, sulfinamoyl groups, N-alkyl-sulfinamoyl groups, N,N-dialkyl-sulfinamoyl groups, N-aryl-sulfinamoyl groups, N,N-diaryl-sulfinamoyl groups, N-alkyl-N-aryl-sulfinamoyl groups, sulfamoyl groups, N-alkyl-sulfamoyl groups, N,N-dialkyl-sulfamoyl groups, N-aryl-sulfamoyl groups, N,N- diaryl-sulfamoyl groups, N-alkyl-N-aryl-sulfamoyl groups, N-acyl-sulfamoyl groups and conjugated base groups thereof, N-alkylsulfonyl-sulfamoyl groups (—SO$_2$NHSO$_2$ (alkyl)) and conjugated base groups thereof, N-arylsulfonyl-sulfamoyl groups (—SO$_2$NHSO$_2$ (aryl)) and conjugated base groups thereof, N-alkylsulfonyl-carbamoyl groups (—CONHSO$_2$ (alkyl)) and conjugated base groups thereof, N-arylsulfonyl-carbamoyl groups (—CONHSO$_2$ (aryl)) and conjugated base groups thereof, alkoxy-silyl groups (—Si(O-alkyl)$_3$), aryloxy-silyl groups (—Si(O-aryl)$_3$), hydroxy-silyl groups (—Si(OH)$_3$) and conjugated base groups thereof, phosphono groups (—PO$_3$H$_2$) and conjugated base groups thereof (hereunder referred to as "phosphonate group(s)"), dialkyl-phosphono groups (—PO$_3$(alkyl)$_2$), diaryl-phosphono groups (—PO$_3$(aryl)$_2$), alkylaryl-phosphono groups (—PO$_3$(alkyl)(aryl)), monoalkyl-phosphono groups (—PO$_3$H(alkyl)) and conjugated base groups thereof (hereunder referred to as "alkyl phosphonate group(s)"), monoaryl-phosphono groups (—PO$_3$H(aryl)) and conjugated base groups thereof (hereunder referred to as "aryl phosphonate group(s)"), phosphono-oxy groups (—OPO$_3$H$_2$) and conjugated base groups thereof (hereunder referred to as "phosphonato-oxy group(s)"), dialkyl-phosphono-oxy groups (—OPO$_3$(alkyl)$_2$), diaryl-phosphono-oxy groups (—OPO$_3$(aryl)$_2$), alkylaryl-phosphono-oxy groups (—OPO$_3$ (alkyl)(aryl)), monoalkyl-phosphono-oxy groups (—OPO$_3$H (alkyl)) and conjugated base groups thereof (hereunder referred to as "alkyl phosphonato-oxy group(s)"), monoaryl-phosphono-oxy groups (—OPO$_3$H(aryl)) and conjugated base groups thereof (hereunder referred to as "aryl phosphonato-oxy group(s)"), cyano group, nitro group, aryl groups, alkenyl groups and alkynyl groups.

Examples of the alkyl groups present as the substituents of the foregoing substituted alkyl groups are alkyl groups specified above.

Specific examples of the aryl groups present as the substituents of the foregoing substituted alkyl groups are phenyl, biphenyl, naphthyl, tolyl, xylyl, mesityl, cumenyl, fluorophenyl, chlorophenyl, bromophenyl, chloromethyl-phenyl, hydroxyphenyl, methoxyphenyl, ethoxyphenyl, phenoxy-phenyl, acetoxy-phenyl, benzoyloxy-phenyl, methylthio-phenyl, phenylthio-phenyl, methylamino-phenyl, di-methylamino-phenyl, acetylamino-phenyl, carboxyphenyl, methoxy-carboxyphenyl, ethoxy-carboxyphenyl, phenoxy-carboxyphenyl, N-phenyl-carbamoylphenyl, phenyl, nitro-phenyl, cyanophenyl, sulfophenyl, sulfonato-phenyl, phosphono-phenyl, and phosphonato-phenyl groups.

Moreover, examples of the alkenyl groups present as the substituents of the foregoing substituted alkyl groups are vinyl, 1-propenyl, 1-butenyl, cinnamyl and 2-chloro-1-ethenyl, and examples of the alkynyl groups thereof are ethynyl, 1-propynyl, 1-butynyl, trimethylsilyl-ethynyl, and phenyl-ethynyl groups.

Examples of the acyl groups present as the substituents of the foregoing substituted alkyl groups are those represented by the general formula: R$^4$CO—, wherein R$^4$ may be, for instance, a hydrogen atom, and the aforementioned alkyl, aryl, alkenyl and alkynyl groups.

On the other hand, the alkylene groups in the foregoing substituted alkyl groups may be, for instance, divalent organic groups derived from the foregoing alkyl groups having 1 to 20 carbon atoms, in which either of the hydrogen atoms is removed and preferably used herein may be, for instance, linear alkylene groups having 1 to 12 carbon atoms, branched alkylene groups having 3 to 12 carbon atoms and cyclic alkylene groups having 5 to 10 carbon atoms. Specific examples of the substituted alkyl groups preferably used herein are chloromethyl, bromomethyl, 2-chloroethyl, trifluoromethyl, methoxymethyl, methoxy-ethoxyethyl, allyloxy-methyl, phenoxy-methyl, methylthio-methyl, tolylthio-methyl, ethyl-aminoethyl, diethylamino-propyl, morpholino-propyl, acetyloxy-methyl, benzoyloxy-methyl, N-cyclohexyl-carbamoyloxy-ethyl, N-phenyl-carbamoyloxy-ethyl, acetylamino-ethyl, N-methylbenzoyl-aminopropyl, 2-oxoethyl, 2-oxopropyl, carboxypropyl, methoxy-carbonyl-ethyl, methoxycarbonyl-methyl, methoxycarbonyl-butyl, ethoxycarbonyl-methyl, butoxycarbonyl-methyl, allyloxy-carbonylmethyl, benzyloxy-carbonyl-methyl, methoxycarbonyl-phenylmethyl, trichloromethyl-carbonyl-methyl, allyloxy-carbonylbutyl, chlorophenoxy-carbonylmethyl, carbamoylmethyl, N-methyl-carbamoylethyl, N,N-dipropyl-carbamoylmethyl, N-(methoxyphenyl)-carbamoylethyl, N-methyl-N-(sulfophenyl) carbamoylmethyl, sulfopropyl, sulfobutyl, sulfonato-butyl, sulfamoyl-butyl, N-ethylsulfamoyl-methyl, N,N-dipropyl-sulfamoylpropyl, N-tolylsulfamoyl-propyl, N-methyl-N-(phosphono-phenyl) sulfamoyl-octyl, phosphono-butyl, phosphonato-hexyl, diethyl-phosphono-butyl, di-phenyl-phosphono-propyl, methyl-phosphono-butyl, methyl-phosphonato-butyl, tolyl-phosphonohexyl, tolyl-phosphonato-hexyl, phosphono-oxypropyl, phosphonato-oxybutyl, benzyl, phenethyl, α-methylbenzyl, 1-methyl-1-phenylethyl, p-methyl-benzyl, cinnamyl, allyl, 1-propenylmethyl, 2-butenyl, 2-methylallyl, 2-methyl-propenyl-methyl, 2-propynyl, 2-butynyl and 3-butynyl groups, and the groups represented by the following formulas:

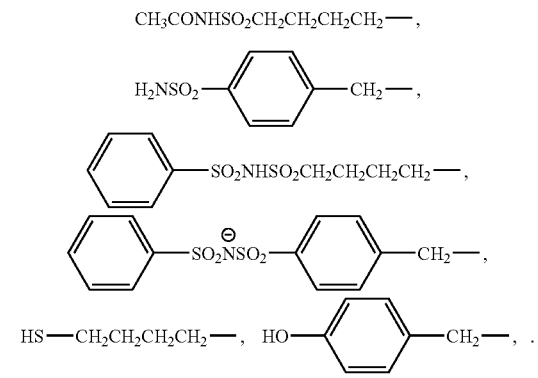

The aryl groups as the "monovalent hydrocarbon groups" may be, for instance, fused rings each formed from 1 to 3 benzene rings through fusion, and fused rings each formed from a benzene ring and a 5-membered unsaturated ring through fusion and specific examples thereof are phenyl, naphthyl, anthryl, phenanthryl, indenyl, acenaphthenyl and fluorenyl groups, with phenyl and naphthyl groups being more preferably used herein among others.

The substituted aryl group as the "monovalent hydrocarbon group" is an aryl group to which a substituent is linked and usable herein may be, for instance, the foregoing aryl groups carrying, on the ring-constituting carbon atom(s), one or more of monovalent non-metal atomic groups except for hydrogen atom. Examples of such substituents preferably used herein are the aforementioned alkyl and substituted alkyl groups and those listed above as substituents in the substituted alkyl groups. Specific examples of these substituted aryl groups preferably used in the invention include biphenyl, tolyl, xylyl, mesityl, cumenyl, chlorophenyl, bromophenyl, fluoro-phenyl, chloromethyl-phenyl, trifluoromethyl-phenyl, hydroxyphenyl, methoxy-phenyl, methoxyethoxy-phenyl, allyloxy-phenyl, phenoxy-phenyl, methylthio-phenyl, tolylthio-phenyl, phenylthio-phenyl, ethylamino-phenyl, diethylamino-phenyl, morpholino-phenyl, acetyloxy-phenyl, benzoyloxy-phenyl, N-cyclohexyl-carbamoyloxy-phenyl, N-phenyl-carbamoyloxy-phenyl, acetyl-aminophenyl, N-methylbenzoyl-aminophenyl, carboxyphenyl, methoxy-carboxyphenyl, allyloxy-carboxyphenyl, chlorophenoxy-carbonyphenyl, carbamoylphenyl, N-methyl-carbamoylphenyl, N,N-dipropyl-carbamoylphenyl, N-(methoxyphenyl)-carbamoylphenyl, N-methyl-N-(sulfophenyl) carbamoylphenyl, sulfophenyl, sulfonato-phenyl, sulfamoyl-phenyl, N-ethylsulfamoyl-phenyl, N,N-dipropyl-sulfamoyl-phenyl, N-tolyl-sulfamoyl-phenyl, N-methyl-N-(phosphono-phenyl)sulfamoyl-phenyl, phosphono-phenyl, phosphonato-phenyl, diethyl-phosphono-phenyl, diphenyl-phosphono-phenyl, methyl-phosphono-phenyl, methyl-phosphonato-phenyl, tolyl-phosphono-phenyl, tolyl-phosphonato-phenyl, allyl, 1-propenyl-methyl, 2-butenyl, 2-methylallyl-phenyl, 2-methyl-propenylphenyl, 2-propynylphenyl, 2-butynylphenyl and 3-butynylphenyl, groups.

The alkenyl groups as the "monovalent hydrocarbon group" may be, for instance, those listed above. The substituted alkenyl group is an alkenyl group in which one or more of the hydrogen atoms thereof are replaced with one or more of substituents and the substituent may be, for instance, those discussed above in connection with the substituted alkyl group. On the other hand, the alkenyl groups in this case may be those described above. Examples of such substituted alkenyl groups preferably used herein include those represented by the following structural formulas:

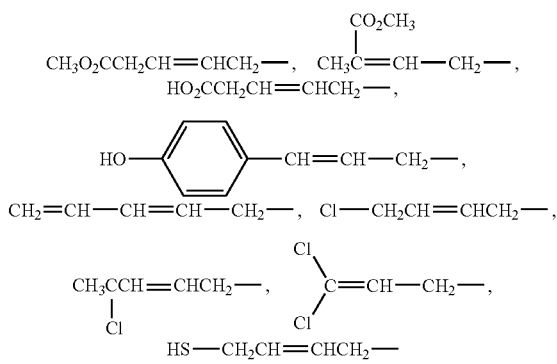

The alkynyl group as a "monovalent hydrocarbon group" may be, for instance, those described above. The substituted alkynyl group is an alkynyl group in which one or more of the hydrogen atoms of an alkynyl group are replaced with one or more of substituents and such substituents may be, for instance, those described above in connection with the substituted alkyl group. On the other hand, the alkynyl groups may be those described above.

The "hetero ring-containing group" used in this specification may be, for instance, a monovalent group obtained by removing one hydrogen atom present on the hetero ring, and a monovalent group obtained by further replacing a hydrogen atom present on the foregoing monovalent group with a substituent selected from those described above in connection with the substituted alkyl group (substituted hetero ring-containing group). Examples of preferred hetero rings are those represented by the following chemical formulas:

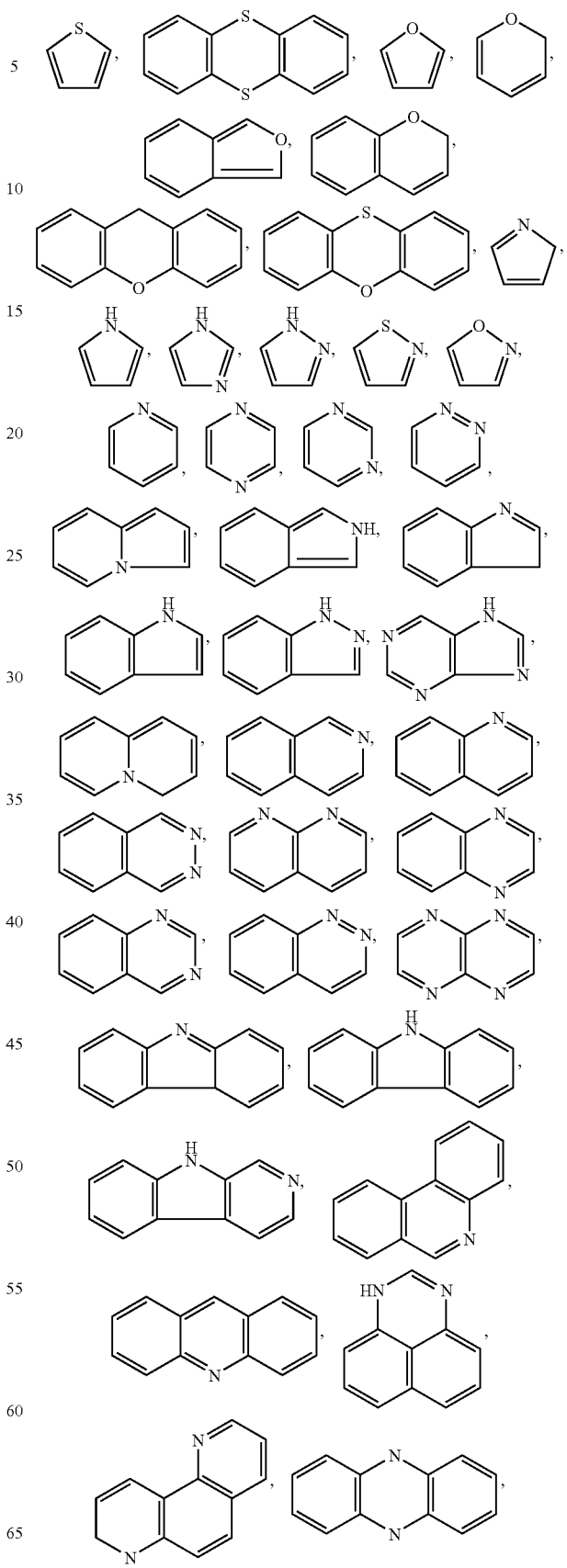

-continued

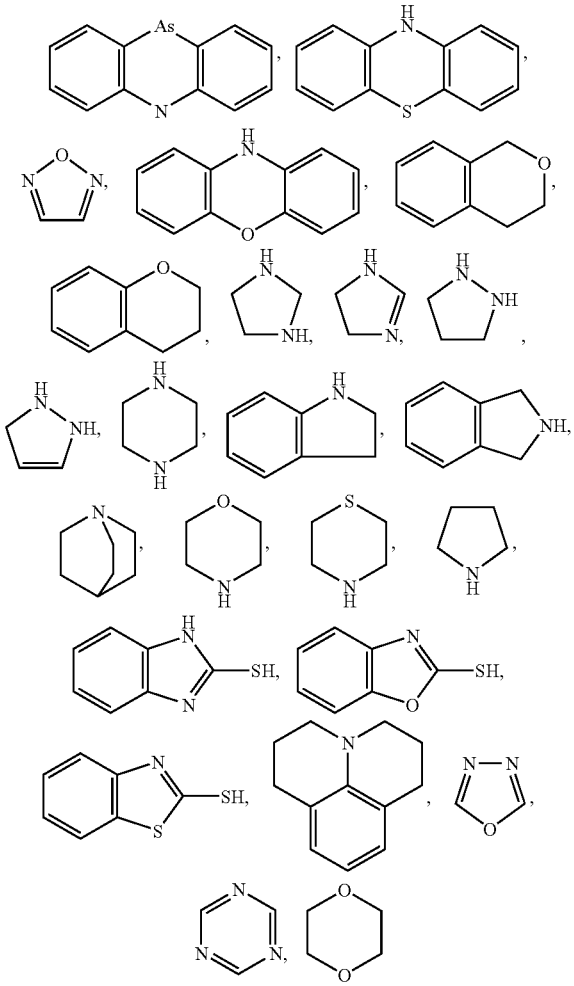

The substituted oxy group used in this specification can be represented by the general formula: $R^5O—$, wherein $R^5$ represents a monovalent nonmetal atomic group except for hydrogen atom. Examples of preferred substituted oxy groups include alkoxy, aryloxy, acyloxy, carbamoyloxy, N-alkyl-carbamoyloxy, N-aryl-carbamoyloxy, N,N-dialkyl-carbamoyloxy, N,N-diaryl-carbamoyloxy, N-alkyl-N-aryl-carbamoyloxy, alkylsulfoxy, arylsulfoxy, phosphono-oxy and phosphonato-oxy groups. In this respect, the alkyl and aryl groups in these groups may be alkyl and substituted alkyl groups and aryl and substituted aryl groups, as has been described above. The acyl group present in the acyloxy group may be one represented by the following general formula: $R^6CO—$, wherein $R^6$ may be an alkyl or a substituted alkyl group, or an aryl or a substituted aryl group, as has been described above. Among these substituents, more preferably used herein are alkoxy, aryloxy, acyloxy and arylsulfoxy groups. Specific examples of substituted oxy groups preferably used herein include methoxy, ethoxy, propyloxy, isopropyloxy, butyloxy, pentyloxy, hexyloxy, dodecyloxy, benzyloxy, allyloxy, phenethyloxy, carboxy-ethyloxy, methoxycarbonylethyloxy, ethoxycarbonyl-ethyloxy, methoxyethoxy, phenoxyethoxy, methoxy-ethoxyethoxy, ethoxy-ethoxyethoxy, morpholino-ethoxy, morpholinopropyl-oxy, allyloxy-ethoxyethoxy, phenoxy, tolyloxy, xylyloxy, mesityloxy, cumenyloxy, methoxy-phenyloxy, ethoxyphenyloxy, chlorophenyl-oxy, bromophenyl-oxy, acetyloxy, benzoyloxy, naphthyloxy, phenyl-sulfonyloxy, phosphono-oxy and phosphonato-oxy groups.

The substituted thio group used herein and disclosed in this specification is one represented by the following general formula: $R^7S—$, wherein $R^7$ may be a monovalent non-metal atomic group except for hydrogen atom. Examples of preferred substituted thio groups are alkylthio, arylthio, alkyldithio, aryldithio and acylthio groups. In this respect, the alkyl and aryl groups in these groups may be alkyl and substituted alkyl groups and aryl and substituted aryl groups, as has been described above and the substituent $R^6$ appearing in the acyl group ($R^6CO—$) present in the acylthio group may be the same as that specified above. Among these, more preferably used herein are alkylthio and arylthio groups among others. Specific examples of preferred substituted thio groups are methylthio, ethylthio, phenylthio, ethoxy-ethylthio, carboxy-ethylthio and methoxycarbonyl-thio groups.

The substituted amino group used herein and disclosed in this specification is one represented by the following general formula: $R^8NH—$ or $(R^9)(R^{10})N—$, wherein $R^8$, $R^9$ and $R^{10}$ each represents a monovalent non-metal atomic group except for hydrogen atom. Examples of such substituted amino groups preferably used in the invention include N-alkylamino, N,N-dialkylamino, N-arylamino, N,N-diarylamino, N-alkyl-N-arylamino, acylamino, N-alkyl-acylamino, N-aryl-acylamino, ureido, N'-alkylureido, N',N'-dialkyl-ureido, N'-arylureido, N',N'-diaryl-ureido, N'-alkyl-N'-arylureido, N-alkylureido, N-arylureido, N'-alkyl-N-alkylureido, N'-alkyl-N-aryl-ureido, N',N'-dialkyl-N-alkylureido, N',N'-dialkyl-N-arylureido, N'-aryl-N-alkyl-ureido, N'-aryl-N-arylureido, N',N'-diaryl-N-alkylureido, N',N'-diaryl-N-arylureido, N'-alkyl-N'-aryl-N-alkylureido, N'-alkyl-N'-aryl-N-arylureido, alkoxy-carbonylamino, aryloxy-carbonylamino, N-alkyl-N-alkoxy-carbonylamino, N-alkyl-N-aryloxy-carbonylamino, N-aryl-N-alkoxy-carbonylamino and N-aryl-N-aryloxy-carbonyl-amino groups. In this respect, the alkyl and aryl groups in these groups may be alkyl and substituted alkyl groups and aryl and substituted aryl groups, as has been described above. Moreover, the acyl group present in the acylamino, N-alkyl-acylamino, and N-aryl-acylamino groups may be one represented by the following general formula: $R^6CO—$, wherein $R^6$ may be the same as that defined above. Among these, more preferably used herein are N-alkylamino, N,N-dialkyl-amino, N-arylamino, and acylamino groups. Examples of preferred substituted amino groups are methylamino, ethylamino, diethylamino, morpholino, piperidino, pyrrolidino, phenylamino, benzoylamino and acetylamino groups.

The substituted carbonyl group used herein and disclosed in this specification may be one represented by the following general formula: $R^{11}CO—$, wherein $R^{11}$ may be a monovalent non-metal atomic group. Examples of such substituted carbonyl groups preferably used in the invention are formyl, acyl, carboxyl, alkoxycarbonyl, aryloxycarbonyl, carbamoyl, N-alkyl-carbamoyl, N,N-di-alkyl-carbamoyl, N-aryl-carbamoyl, N,N-diaryl-carbamoyl and N-alkyl-N-aryl-carbamoyl groups. In this respect, the alkyl and aryl groups in these groups may be alkyl and substituted alkyl groups and aryl and substituted aryl groups, as has been described above. Among them, more preferably used substituted carbonyl groups are formyl, acyl, carboxyl, alkoxycarbonyl, aryloxycarbonyl, carbamoyl, N-alkyl-carbamoyl, N,N-di-alkyl-carbamoyl and N-aryl-carbamoyl groups, with formyl, acyl, alkoxycarbonyl and aryloxycarbonyl being more preferably used in the invention. Specific examples of substituted carbonyl groups preferably used herein are formyl, acetyl, benzoyl, carboxyl, methoxycarbonyl, allyloxy-carbonyl, N-methyl-carbamoyl, N-phenyl-carbamoyl, N,N-diethyl-carbamoyl and morpholino-carbonyl groups.

The substituted sulfinyl group used herein and described in this specification may be one represented by the following general formula: $R^{12}SO—$, wherein $R^{12}$ may be a monovalent non-metal atomic group. Examples thereof preferably used herein are alkylsulfinyl, arylsulfinyl, sulfinamoyl, N-alkyl-sulfinamoyl, N,N-dialkyl-sulfinamoyl, N-aryl-sulfinamoyl, N,N-diaryl-sulfinamoyl and N-alkyl-N-aryl-sulfinamoyl groups. In this respect, the alkyl and aryl groups in these groups may be alkyl and substituted alkyl groups and aryl and substituted aryl groups, as has been described above. Among these examples, more preferred are alkylsulfinyl groups and arylsulfinyl groups. Specific examples of such substituted sulfinyl groups are hexyl-sulfinyl group, benzyl-sulfinyl group and tolyl-sulfinyl group.

The substituted sulfonyl group used herein and described in this specification may be one represented by the following general formula: $R^{13}—SO_2—$, wherein $R^{13}$ represents a monovalent non-metal atomic group. More preferably used herein may be, for instance, alkylsulfonyl and arylsulfonyl groups. In this respect, the alkyl and aryl groups in these groups may be alkyl and substituted alkyl groups and aryl and substituted aryl groups, as has been described above. Specific examples of such substituted sulfonyl groups are butyl-sulfonyl and chlorophenyl-sulfonyl groups.

As has been discussed above, the sulfonate group ($—SO_3—$) used in the specification means anionic conjugated base groups derived from sulfo group ($—SO_3H$) and preferably, it is usually used in combination with a counter cation thereof. Such counter cations may be, for instance, currently known ones or a variety of onium ions (such as ammoniums, sulfoniums, phosphoniums, iodoniums and aziniums) and metal ions (such as $Na^+$, $K^+$, $Ca^{2+}$ and $Zn^{2+}$).

As has been discussed above, the carboxylate group ($—CO_2—$) used in this specification means anionic conjugated base groups derived from a carboxyl group ($—CO_2H$). Preferably, it is usually used in combination with a counter cation thereof. In this respect, such counter cations may be, for instance, currently known ones or a variety of onium ions (such as ammoniums, sulfoniums, phosphoniums, iodoniums and aziniums) and metal ions (such as $Na^+$, $K^+$, $Ca^{2+}$ and $Zn^{2+}$).

The substituted phosphono group used in the specification means a group corresponding to a phosphono group in which one or two hydroxyl groups are substituted with one or two other organic oxo groups and preferred examples thereof include dialkyl-phosphono, diaryl-phosphono, alkylaryl-phosphono, mono-alkyl-phosphono and monoaryl-phosphono groups. Among these phosphono groups, more preferably used herein are dialkyl-phosphono and diaryl-phosphono groups. Specific examples of such substituted phosphono groups include diethyl-phosphono, dibutyl-phosphono and diphenyl-phosphono groups.

The phosphonate group ($—PO_3^{2-}$, $—PO_3H^-$) used in this specification means an anionic conjugated base group derived from the acid-primary or secondary dissociation of a phosphono group ($—PO_3H_2$), as has been described above. Preferably, it is usually used in combination with a counter cation thereof. Such counter cations may be, for instance, currently known ones or a variety of onium ions (such as ammoniums, sulfoniums, phosphoniums, iodoniums and aziniums) and metal ions (such as $Na^+$, $K^+$, $Ca^{2+}$ and $Zn^{2+}$).

The substituted phosphonate group used in this specification means an anionic conjugated base group derived from a product obtained by replacing, with an organic oxo group, one of the hydroxyl groups present in the foregoing substituted phosphono group and specific examples thereof are conjugated bases of monoalkyl-phosphono groups ($—PO_3H$(alkyl)) and monoaryl-phosphono groups ($—PO_3H$(aryl)) as has been described above. Preferably, it is usually used in combination with a counter cation thereof. Such counter cations may be, for instance, currently known ones, or a variety of onium ions (such as ammoniums, sulfoniums, phosphoniums, iodoniums and aziniums) and metal ions (such as $Na^+$, $K^+$, $Ca^{2+}$ and $Zn^{2+}$).

Specific examples of the secondary or tertiary, linear or cyclic monovalent hydrocarbon groups having not less than 7 carbon atoms, appearing in the general formulas (I) to (IV) are adamantyl group, noradamantyl group; decalin residue, tricyclo-decanyl group, tetracyclo-dodecanyl group, norbornyl group, cedrol group, cycloheptyl group, cyclooctyl group, cyclodecanyl group and cyclododecanyl group. More preferably used herein are adamantyl group, decalin residue, norbornyl group, cedrol, group cycloheptyl, group cyclooctyl group, cyclodecanyl group and cyclododecanyl group. The secondary or tertiary, linear or cyclic divalent hydrocarbon groups having not less than 7 carbon atom, appearing in the general formulas (I) to (IV), is a group obtained by removing a hydrogen atom or other atom or group from the monovalent hydrocarbon group listed above to thus convert the same into divalent one.

The secondary or tertiary, linear or cyclic monovalent hydrocarbon group having not less than 7 carbon atoms may additionally comprise a substituent and examples of such substituents are alkyl groups, substituted alkyl groups, halogen atoms, hydroxyl group, alkoxy groups, carboxyl groups and alkoxycarbonyl groups. The alkyl groups are preferably lower alkyl groups such as methyl, ethyl, propyl, isopropyl and butyl groups, and more preferably used herein are methyl, ethyl, propyl and isopropyl groups. Examples of the substituent of the alkyl groups are hydroxyl group, halogen atoms and alkoxy groups. Examples of the alkoxy groups are those having 1 to 4 carbon atoms such as methoxy, ethoxy, propoxy and butoxy groups.

Then examples of the ring structures formed from the pairs of X and $R^c$; $R^a$ and $R^b$; and X and $R^a$ or $R^b$ linked together will be given below. Examples of aliphatic rings formed from the pairs of X and $R^c$; $R^a$ and $R^b$; and X and $R^a$ or $R^b$ linked together are 5-, 6-, 7- and 8-membered aliphatic rings and more preferably 5- and 6-membered aliphatic rings. These rings each may further have a substituent on a carbon atom constituting the same (examples of such substituents are those listed above in connection with the substituted alkyl group), or a part of the ring-forming carbon atoms may be replaced with a hetero atom (such as an oxygen, sulfur or nitrogen atom). Furthermore, a part of the aliphatic ring may form a part of an aromatic ring.

Specific examples of the compounds having the structures represented by the general formulas (I) to (IV), which can be used in the present invention will be given below, but the present invention is not restricted to these specific compounds at all:

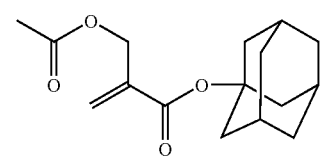

I-1

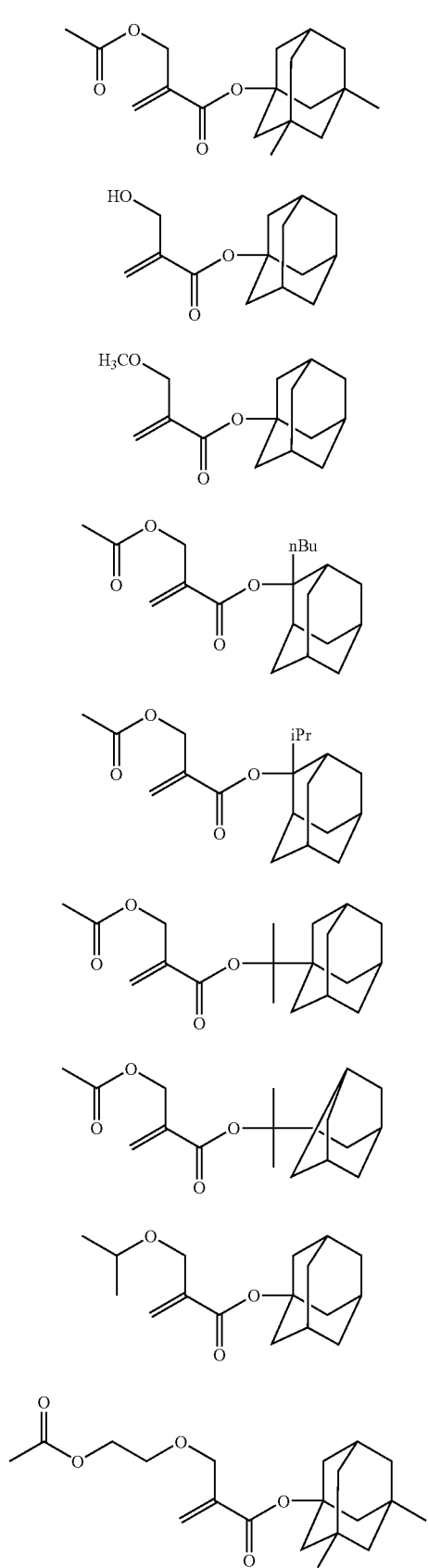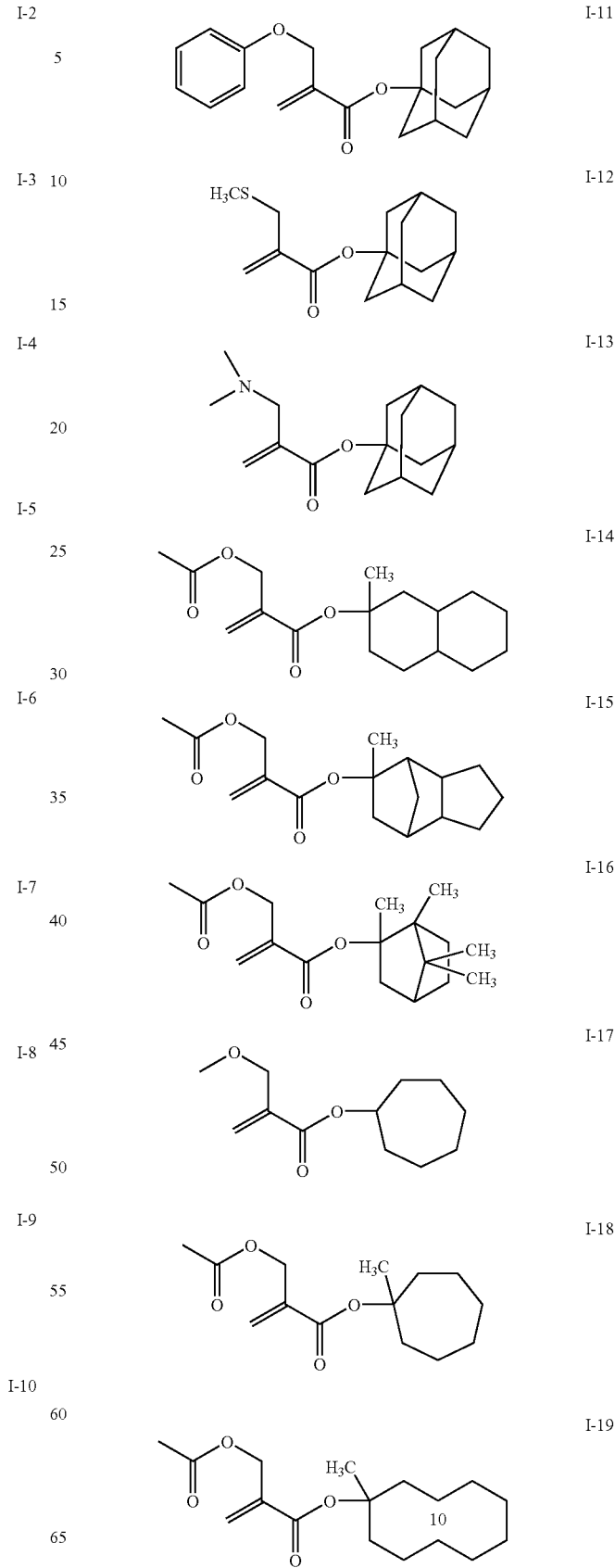

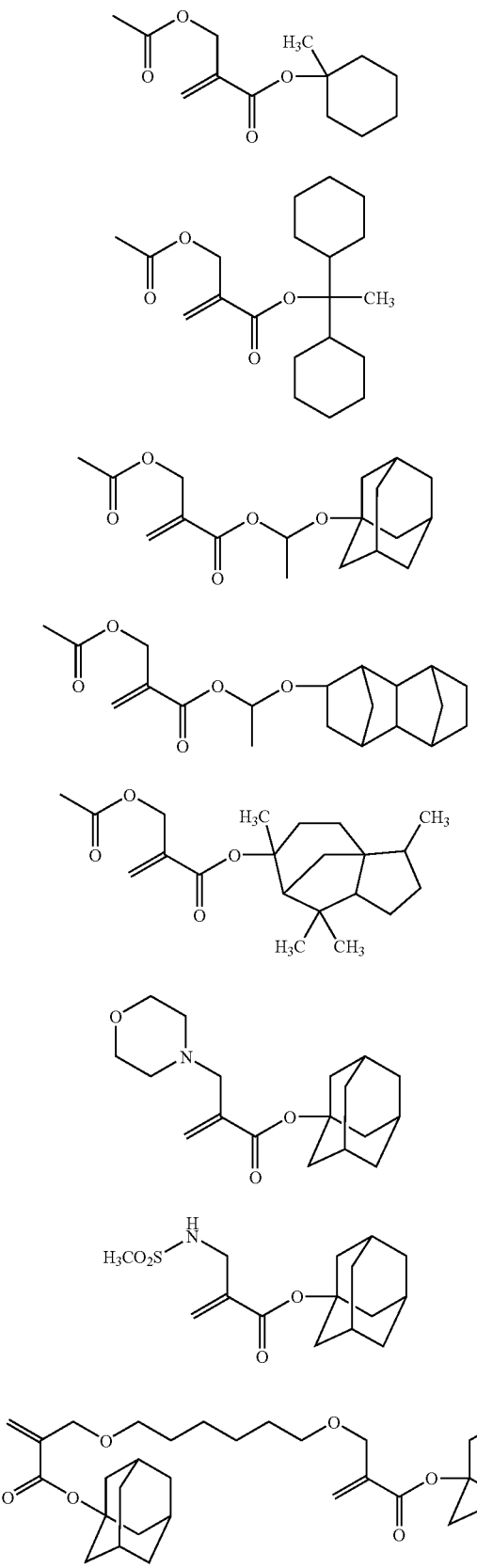

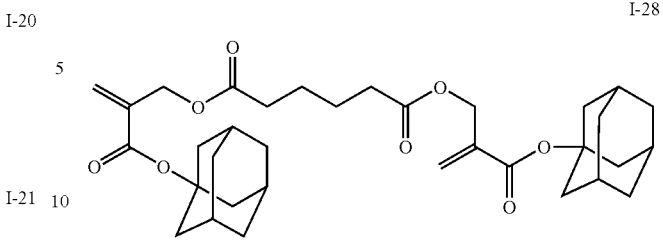

In the ink composition of the present invention, the foregoing α-hetero atom-containing methacrylic compound is used in a rate ranging from 5 to 95% by mass and preferably 15 to 85% by mass on the basis of the total mass of the ink composition.

Regarding the polymerizable compound, it is also possible to additionally use polymerizable compounds other than the foregoing α-hetero atom-containing methacrylic compound and such other polymerizable compounds may be, for instance, monoacrylate compounds, polyfunctional acrylate monomers and polyfunctional acrylate oligomers. Examples of such other polymerizable compounds are isomyristyl acrylate, isostearyl acrylate, lauryl acrylate, isoamyl acrylate, stearyl acrylate, ethoxy-diethylene glycol acrylate, methoxy-polyethylene glycol acrylate, methoxy-dipropylene glycol acrylate, 2-(2-ethoxyethoxy)ethyl acrylate, butoxy ethyl acrylate, isobornyl acrylate, phenoxy polyethylene glycol acrylate, 2-ethylhexyl-diglycol acrylate, 2-acryloyloxyethyl phthalate, 2-acryloyl-oxyethyl-2-hydroxyethyl phthalate, ethoxylated phenyl acrylate, 2-acryloyloxyethyl succinate, nonylphenol-ethylene oxide adduct acrylate, 2-acryloyloxyethyl hexa-hydro-phthalate, lactone-modified flexible acrylate, poly(tetramethylene glycol diacrylate), tetramethylene glycol diacrylate, hydroxy pivalic acid neopentyl glycol diacrylate, dimethylol tricyclodecane diacrylate, dimethylol dicyclo-pentane diacrylate, propylene glycol diglycidyl ether-acrylic acid adduct, modified bisphenol A diacrylates such as bisphenol A diglycidyl ether-(meth)acrylic acid adduct, diacrylate of bisphenol A-propylene oxide adduct, diacrylate of bisphenol A-ethylene oxide adduct, glycerin propoxy triacrylate, pentaerythritol tetraacrylate, pentaerythritol ethoxy tetraacrylate, pentaerythritol hexaacrylate, caprolactone-modified di-pentaerythritol hexaacrylate, ethylene oxide-modified trimethylol-propane triacrylate, caprolactone-modified trimethylol-propane triacrylate, di-trimethylolpropane tetraacrylate, amine-modified polyester tetraacrylate, pentaerythritol triacrylate tolylene diisocyanate urethane prepolymer, and pentaerythritol triacrylate hexamethylene diisocyanate urethane prepolymer. It is also possible to use a polymerizable monomer or oligomer having a molecular weight of not less than 400 (such as an acrylate monomer or an acrylate oligomer having a molecular weight of not less than 400) simultaneous with the foregoing polymerizable compounds. Among them, preferably used herein as such other polymerizable compounds are at least one member selected from the group consisting of isomyristyl acrylate, isostearyl acrylate, lauryl acrylate, isoamyl acrylate, stearyl acrylate, ethoxy-diethylene glycol acrylate, methoxy-polyethylene glycol acrylate, methoxy-dipropylene glycol acrylate, 2-(2-ethoxyethoxy)ethyl acrylate and lactone-modified flexible acrylate.

The foregoing other polymerizable compound which can be used simultaneous with the α-hetero atom-containing methacrylic compound of the present invention can be used in the ink composition of the present invention in a rate preferably ranging from 5 to 85% by mass and more preferably 5 to 70% by mass on the basis of the total mass of the polymerizable compounds.

(1-2) [Polymerization Initiator]

The radiant rays suitably used herein are ultraviolet light rays (UV light rays), visible light rays or infrared light rays and therefore, it is preferred to incorporate, for instance, a radical polymerization initiator, an auxiliary agent for initiating polymerization, and/or a sensitizing dye into the ink composition, while taking into consideration the wavelength of the radiant rays selected. The amount of these compounds to be added to the composition should in general be in the range of from 1 to 10% by mass on the basis of the total mass of the ink composition. The polymerization initiator usable herein may be a variety of known compounds, but they are preferably selected from those soluble in the polymerizable compounds used in the invention and specific examples thereof include xanthone or thioxanthone type polymerization initiators, benzophenone type polymerization initiators, quinone type polymerization initiators and phosphine-oxide type polymerization initiators.

In addition, a polymerization inhibitor is preferably incorporated into the ink composition in an amount ranging from 200 to 20,000 ppm in order to improve the storage stability of the composition. When using the ink composition of the present invention as an ink jet-recording ink composition, it is preferably heated to a temperature ranging from 40 to 80° C. to thus reduce the viscosity thereof prior to the ejection thereof and accordingly, a polymerization inhibitor is incorporated into the ink composition in order to certainly prevent any clogging of the recording heat. Specific examples of such polymerization inhibitors are hydroquinone, benzoquinone, p-methoxy-phenol, TEMPO, TEMPOL and Cupferron Al.

(1-3) [Coloring Material]

A coloring material may be incorporated into the ink composition of the present invention. Such a coloring material usable herein is not restricted to any particular one, but preferably used are pigments excellent in the weatherability. The coloring materials usable herein are any known one such as water-soluble dyes and oil-soluble dyes.

Now, pigments preferably used herein will be described below in detail. The ink composition of the present invention may comprise pigments which cannot practically be applied to the ink jet-recording ink composition because they do not necessarily have high color-developing ability (color density per unitary concentration thereof added), while the use thereof at a high concentration would results in such a phenomenon that the melt viscosity of the resulting ink composition increases up to an extremely high level due to the difficulty in the preparation of a uniform fine particle-dispersion. More specifically, the coloring materials used in the present invention are not restricted to specific ones, but specific examples thereof are organic and inorganic pigments specified by the following numerals and disclosed in, for instance, Color Index:

Examples thereof include red or magenta pigments such as Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20 and 36; blue or cyan pigments such as Pigment Blue 1, 15, 15:1, 15:2, 15:3, 15:4, 15:6, 16, 17-1, 22, 27, 28, 29, 36, and 60; green pigments such as Pigment Green 7, 26, 36, and 50; yellow pigments such as Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193; black pigments such as Pigment Black 7, 28, and 26; and white pigments such as Pigment White 6, 18, and 21, which can arbitrarily be selected depending on the intended purposes.

In this connection, the coloring material can be dispersed in the composition using a various kinds of dispersion devices such as a ball mill, sand mill, an attritor, a roll mill, an agitator, a Henschel mixer, a colloid mill, an ultrasonic homogenizer, a pearl mill, a wet jet-mill, and a paint shaker. In addition, a dispersant may be used when the coloring material is dispersed within the composition. Such a dispersant is not restricted to any specific one, but preferably used herein are polymeric dispersants and examples thereof include those available from Zeneca Company under the trade name of Solsperse series. It is also possible to use, as an auxiliary agent for dispersion, a synergist corresponding to each pigment. These dispersants and auxiliary agents for dispersion are preferably added to the ink composition in an amount ranging from 1 to 50 parts by mass per 100 parts of the coloring material used in the invention. In this connection, a dispersion medium may be used. The dispersion medium may be a solvent or the polymerizable compound used in the present invention, but the radiation-curable ink composition of the present invention is preferably free of any solvent, since it should be cured through the reaction thereof immediately after the impact on a subject.

If the solvent remains within the cured images, various problems arise, for instance, the deterioration of the resistance to solvent attack and various troubles related to the VOC (Volatile Organic Compound) due to the residual solvent. For this reason, the dispersion medium used herein is not a solvent, but a polymerizable compound, in particular, a monomer preferably selected from those having a lowest possible viscosity, from the viewpoint of the dispersibility of the pigment.

In the present invention, the selection of a pigment, a dispersant and a dispersion medium, the conditions for the dispersion thereof and the conditions for the filtration thereof should be appropriately selected in such a manner that the average particle size of the pigment used in the invention preferably ranges from 0.08 to 0.5 μm; and the maximum particle size thereof suitably ranges, for instance, from 0.3 to 10 μm and preferably 0.3 to 3 μm. Such particle size control would permit and ensure the inhibition of the occurrence of any clogging of head nozzles, and the improvement or conservation of storage stability, transparency and sensitivity to curing of the resulting ink. Moreover, when incorporating a coloring material into the ink composition of the present invention, it is suitable that the amount thereof to be added ranges from 1 to 10% by mass and preferably 2 to 8% by mass on the basis of the total mass of the ink composition.

Other components may if necessary be incorporated into the ink composition of the present invention, in addition to those described above.

(1-4) [Other Components]

Other components may if necessary be incorporated into the ink composition of the present invention. Examples of such other components are polymerization inhibitors and solvents.

The polymerization inhibitor may be added thereto in order to improve the shelf stability of the resulting composition. In addition, the ink composition of the present invention is preferably heated to a temperature ranging from 40 to 80° C. to thus reduce the viscosity thereof prior to the ejection thereof and accordingly, a polymerization inhibitor is preferably added to the composition to prevent any clogging of the head due to the heat polymerization thereof. The polymerization inhibitor is added to the ink composition of the invention in an amount ranging from 200 to 20000 ppm on the basis of the total mass of the composition. Examples of such polymerization inhibitors are hydroquinone, benzoquinone, p-methoxyphenol, TEMPO, TEMPOL and Cupferron Al.

It is desirable that the ink composition of the present invention is free of any solvent to prevent the occurrence of such problems concerning the resistance to solvent attack and VOC, but it is effective to use an organic solvent for the improvement of the adhesion thereof to a recording medium in a quite small amount which never becomes a cause of the foregoing problems.

Specific examples of such solvents are ketone type solvents such as acetone, methyl ethyl ketone and diethyl ketone; alcohol type solvents such as methanol, ethanol, 2-propanol, 1-propanol, 1-butanol and tert-butanol; chlorine atom-containing solvents such as chloroform and methylene chloride; aromatic solvents such as benzene and toluene; ester type solvents such as ethyl acetate, butyl acetate and isopropyl acetate; ether type solvents such as diethyl ether, tetrahydrofuran and dioxane; and glycol ether type solvents such as ethylene glycol monomethyl ether and ethylene glycol dimethyl ether.

In this case, the amount of the solvent used preferably ranges from 0.1 to 5% by mass and more preferably 0.1 to 3% by mass on the basis of the total mass of the ink composition.

Moreover, the ink composition of the present invention may simultaneously comprise a radical polymerizable compound or radical polymerization initiator for the improvement of the composition in the sensitivity to curing and in other words, the composition of the present invention may be a radical/cation hybrid type curable ink.

In addition to the foregoing, any known compound may if necessary be added to the ink composition of the invention. Such known compounds may appropriately be selected from the group consisting of, for instance, surfactants, additives for leveling, matting agents, and additives for adjusting the physical properties of the ink film such as polyester resins, polyurethane resins, vinyl resins, acrylic resins, rubber type resins and waxes. In addition, it is likewise preferred that a tackifier such as polyolefin and/or PET, which never adversely affects the polymerization, is incorporated into the ink composition for the improvement of the ink in the adhesion to the recording medium. Specific examples of such tackifiers are high molecular weight adhesive polymers (such as copolymers derived from esters of (meth)acrylic acids and alcohols carrying alkyl groups each having 1 to 20 carbon atoms, esters of (meth)acrylic acids and alicyclic alcohols having 3 to 14 carbon atoms, and esters of (meth)acrylic acids and aromatic alcohols having 6 to 14 carbon atoms) disclosed in J.P. KOKAI 2001-49200 (the description appearing on pages 5 to 6), and polymerizable unsaturated bond-containing low molecular weight tackiness-imparting resins.

(1-5) [Characteristic Properties of Ink Composition]

When using the ink composition as an ink jet-recording ink composition, the composition preferably has a viscosity, at the temperature (for instance, 40 to 80° C. and preferably 25 to 30° C.) encountered when it is ejected, on the order of, for instance, 7 to 30 mPa·sec and preferably 7 to 20 mPa·sec. Preferably, the mixing ratio of the components used in the ink composition of the present invention is appropriately adjusted so that the viscosity of the resulting composition falls within the range specified above. The use of an ink composition whose viscosity at room temperature is set at a higher level would permit the prevention of any penetration thereof into a recording medium even when using a porous recording medium, the reduction of the amount of uncured monomer and the reduction of the quantity of bad smells. Further, this likewise suppresses the occurrence of any bleeding upon the impact of the ink on the recording medium and as a result, the quality of image is considerably improved.

The surface tension of the ink composition according to the present invention ranges, for instance, from 20 to 30 mN/m and preferably 23 to 28 mN/m. When using a variety of recording mediums such as polyolefin materials, PET materials, coated paper and non-coated paper for recording, the surface tension of the ink composition is preferably not less than 20 mN/m from the viewpoint of the bleeding and penetration of the resulting ink, while it is preferably not more than 30 mN/m from the viewpoint of the wettability.

(2) Method and Device for Ink Jet-Recording

The following are detailed description of the ink jet-recording method and the ink jet-recording device, which can suitably be adopted in the present invention:

(2-1) Ink Jet-Recording Method

The present invention provides a method which comprises the steps of ejecting or impacting the foregoing ink composition onto a recording medium (or a substrate) and curing the ink composition ejected onto the substrate by the irradiation thereof with radiant rays to thus form images on the substrate. More specifically, the present invention relates to a method comprising the following steps:

(a) a step for applying the foregoing ink composition onto a recording medium; and (b) a step for curing the ink composition by the irradiation of the ink composition with radiant rays having a peak wavelength ranging from 200 to 600 nm, preferably 300 to 450 nm and more preferably 350 to 420 nm, at an output of not more than 2000 mJ/cm$^2$, preferably 10 to 2000 mJ/cm$^2$, more preferably 20 to 1000 mJ/cm$^2$, and further preferably 50 to 800 mJ/cm$^2$, to thus form images of the cured ink composition on the recording medium.

The recording medium usable herein is not restricted to any specific one and it may be, for instance, paper materials such as the usual non-coated paper and coated paper; a variety of non-absorptive resin materials used in the so-called soft packaging, and resin films obtained by forming the foregoing resins into films. In this respect, examples of the various kinds of plastic films are PET films, OPS films, OPP films, ONy films, PVC films, PE films, and TAC films. In addition to the foregoing, other plastic substances usable as materials for the recording mediums likewise include, for instance, polycarbonate, acrylic resins, ABS, polyacetals, PVA and rubber materials. In addition, metallic and glass materials may be used as recording mediums.

In the ink composition of the present invention, if the materials selected have low heat-shrinkable properties during curing, the resulting ink composition is excellent in the adhesion to a recording medium and therefore, the composition shows such an advantage that it can form highly accurate images even on films quite susceptible to curling and/or deformation due to the shrinkage through the curing of the same or due to the heat generated during the curing reaction such as heat-shrinkable PET films, OPS films, OPP films, ONy films and PVC films.

[Examples of Methods for Ejecting and Impacting Ink Composition on Substrate]

As methods for ejecting and impacting the ink composition on a recording medium, it is preferred to select the ink jet-recording method in which a specially designed ink is ejected through a nozzle in the form of fine liquid drops to thus adhere the drops onto a blank for printing. There have been known, as ink jet-recording heads, the Bubble Jet (registered trade mark) method which comprises applying an electric voltage to a heater to thus generate air bubbles to force out the ink, the thermal ink jet method, and the piezoelectric element system for forcing out an ink through the vibrational motions of a piezoelectric element and the ink composition of the present invention can be used in either of these methods.

Further, the ink jet-recording method of the present invention will be described below in detail while taking, by way of example, a method for preparing a lithographic printing plate which comprises the steps of ejecting an ink composition onto a substrate for lithographic printing plate to thus form images on the substrate.

The lithographic printing plate of the present invention comprises a hydrophilic substrate and hydrophobic regions (images) formed on the hydrophilic substrate using the ink composition of the present invention. This method for preparing a lithographic printing plate comprises the following steps:

(1) a step for ejecting the ink composition of the present invention onto the hydrophilic substrate; and (2) a step of curing the ink composition ejected on the surface of the hydrophilic substrate by irradiating the surface with radiant rays to thus form hydrophobic regions (images) of the cured ink composition on the hydrophilic substrate.

(2-1-1) Lithographic Printing Plate

In this respect, the lithographic printing plate comprises a hydrophilic substrate and images formed on the substrate.

Conventionally, there have widely been used, as an original for obtaining such a lithographic printing plate, the so-called PS plate which comprises a hydrophilic substrate provided thereon with a lipophilic light-sensitive resin layer. Such a lithographic printing plate has in general been prepared by subjecting a PS plate to a mask exposure (surface exposure) through a lithfilm and then removing the un-exposed area through dissolution to thus obtain a desired printing plate. Recently, however, there has widely been used the digitization technique in which image information is electronically treated, accumulated and outputted using a computer and accordingly, there has been desired for the development of a novel image-outputting system capable of coping with the digitization technique. In particular, there has been developed a computer-to-plate (CTP) technique which comprises the step of scanning highly directive light beam such as a laser light beam in response to the digitized image information to thus directly produce a printing plate, without using any lithfilm.

As an example of the method for preparing a lithographic printing plate which permits such an exposure process through scanning, there can be listed, for instance, a method for directly preparing a lithographic printing plate using an ink composition. More specifically, this method comprises the steps of discharging an ink onto the surface of a substrate, preferably a hydrophilic substrate according to, for instance, the ink jet-recording technique and then curing the ink thus deposited on the substrate through the irradiation thereof with radiation to thus form a printing plate provided thereon with desired images of cured ink (preferably hydrophobic images). The ink composition of the present invention is suitably used in such a method for the preparation of a printing plate.

The substrate (recording medium) on which the ink composition of the present invention is discharged is not restricted to any specific one inasmuch as it is a dimensionally stable plate-like substrate. The substrate is preferably a hydrophilic one. Specific examples thereof include paper, paper laminated with a plastic film (such as a polyethylene, polypropylene or polystyrene film), a metal plate (such as an aluminum, zinc or copper plate), a plastic film (such as a film of, for instance, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate and polyvinyl acetal), and paper or a plastic film laminated with the foregoing metal foil or on which the foregoing metal is vapor-deposited. Preferred substrates are, for instance, polyester films and aluminum plates. Preferably used herein are polyester films and aluminum plates. Among them, aluminum plates are particularly preferred, since they have high dimensional stability and they are relatively cheap.

The aluminum plate may be a pure aluminum plate, a plate of an aluminum alloy comprising aluminum as a main component and a trace amount of foreign elements or a thin film of aluminum or an aluminum alloy, which is laminated with a plastic film. Examples of such foreign elements included in the aluminum alloy are silicon, iron, manganese, copper, magnesium, chromium, zinc, bismuth, nickel and titanium. The content of these foreign elements present in the aluminum alloy is preferably not more than 10% by mass. In the present invention, a pure aluminum plate is preferably used as such a substrate, but it would be difficult to form a completely pure aluminum plate because of the limit in the refining technique and therefore, preferably used herein may be aluminum plates containing trace amounts of foreign elements. The aluminum plate usable herein is not restricted in its composition and those prepared from any known aluminum material can appropriately be used without any restriction.

The thickness of the substrate preferably ranges from 0.1 to 0.6 mm and more preferably 0.15 to 0.4 mm.

Prior to the practical use of the aluminum plate, it is preferably subjected to a surface treatment such as a surface-roughening treatment and/or an anodization treatment. These surface-treatments permit the improvement of the hydrophilicity of the substrate surface and make, easy, the achievement of high adhesion thereof to the image-recording layer. The aluminum plate is if necessary degreased with, for instance, a surfactant, an organic solvent and/or an aqueous alkali solution for the removal of the rolling oil present on the surface of the plate prior to the surface-roughening treatment of the aluminum plate.

The aluminum plate may be surface-roughened according to a variety of methods and examples thereof include a mechanical surface-roughening treatment, an electrochemical surface-roughening treatment (surface-roughening treatment in which the surface of the plate is electrochemically dissolved) and a chemical surface-roughening treatment (surface-roughening treatment in which the surface of the plate is chemically and selectively dissolved).

Specific examples of such mechanical surface-roughening treatments are various known ones such as a ball-polishing method, a brush-polishing method, a blast-polishing method and a buff-polishing method. Alternatively, it is also possible to use a transfer method in which uneven patterns are transferred to the surface of the plate using a roll having such uneven patterns on its surface during the step for rolling the aluminum plate.

Examples of such electrochemical surface-roughening treatments include those in which the surface-roughening is carried out by passing, through the aluminum plate, an alternating or direct current in an electrolyte containing, for instance, an acid such as hydrochloric acid or nitric acid. In addition, it is also possible to use a method which makes use of a mixed acid as disclosed in J.P. KOKAI Sho 54-63902.

The aluminum plate thus surface-roughened may if necessary be subjected to an alkali etching treatment using an aqueous solution of, for instance, potassium hydroxide or sodium hydroxide, then it is subjected to a neutralization treatment and thereafter, the plate is if necessary anodized for the improvement of the wear resistance.

Electrolytes usable in the anodization treatment of the aluminum plate are, for instance, a variety of electrolytes capable of forming porous anodized layer and specific examples thereof currently used include sulfuric acid, hydrochloric acid, oxalic acid, chromic acid and mixtures thereof. The concentrations of these electrolytes are appropriately determined depending on the kinds of the electrolytes selected.

The anodization conditions may variously vary depending on the electrolyte used and cannot unconditionally be specified, but preferably used are as follows: an electrolyte concentration ranging from 1 to 80% by mass; an electrolyte solution temperature ranging from 5 to 70° C.; a current density ranging from 5 to 60 A/dm$^2$; an electric voltage ranging from 1 to 100 V; and an electrolyzation time ranging from 10 seconds to 5 minutes. The quantity of the anodized layer formed preferably ranges from 1.0 to 5.0 g/m$^2$ and more preferably 1.5 to 4.0 g/m$^2$. The anodized layer formed in an amount falling within the range specified above would permits the formation of a printing plate having good printing durability and carrying non-image area having good resistance to defects.

The foregoing surface-treated and anodized substrate may be used as the substrate of the present invention without any post-treatment, but the plate may if necessary be subjected to a treatment for the further improvement of the adhesion to the upper layers, the hydrophilicity, the anti-fouling properties, and heat insulating properties, selected from, for instance, the following ones: a treatment for expanding the micropores present in the anodized layer, a sealing treatment of the layer such as those disclosed in J.P. KOKAI Nos. 2001-253181 and 2001-322365; and a surface-hydrophilization treatment comprising dipping the plate in an aqueous solution containing a hydrophilic compound. Of course, the micropore-expansion treatment and the sealing treatment are not restricted to these specific ones and they may be any conventionally known one.

[Sealing Treatment]

Examples of such sealing treatments are a steam-sealing treatment, a sealing treatment with fluoro-zirconic acid alone, a sealing treatment with an aqueous solution containing an inorganic fluorine atom-containing compound such as sodium fluoride, a lithium chloride-containing steam-sealing treatment and a sealing treatment with hot water.

Among them, preferably used herein are sealing treatments using aqueous solutions containing inorganic fluorine atom-containing compounds, a steam-sealing treatment and a sealing treatment with hot water. These treatments will now be described in more detail below:

<Sealing Treatment with Aqueous Solution of Inorganic Fluoride Compound>

In this sealing treatment using an aqueous solution containing an inorganic fluorine atom-containing compound, such an inorganic fluorine atom-containing compound used may suitably be metal fluorides.

Specific examples thereof are sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, fluoro-zirconic acid, fluoro-titanic acid, hexafluoro-silicic acid, nickel fluoride, iron fluoride, fluoro-phosphoric acid, and ammonium fluoro-phosphate. Among these, preferred are sodium fluorozirconate, sodium fluorotitanate, fluoro-zirconic acid and fluoro-titanic acid.

The concentration of the inorganic fluorine atom-containing compound present in the aqueous solution is preferably not less than 0.01% by mass and more preferably not less than 0.05% by mass for ensuring the sufficient sealing of the micropores present in the anodized layer; and preferably not more than 1% by mass and more preferably not more than 0.5% by mass from the viewpoint of the anti-fouling properties.

Preferably, the aqueous solution containing an inorganic fluorine atom-containing compound further comprises a phosphoric acid salt compound. The incorporation of such a compound would permit the improvement of the hydrophilicity of the surface of the anodized layer and this in turn results in the improvement of the ability of the resulting plate to be developed on a printing machine and the anti-fouling properties of the resulting printing plate.

Examples of such phosphoric acid salt compounds are salts of phosphoric acid with metals such as alkali metals and alkaline earth metals.

Specific examples thereof include zinc phosphate, aluminum phosphate, ammonium phosphate, di-ammonium hydrogen phosphate, ammonium di-hydrogen phosphate, mono-ammonium phosphate, mono-potassium phosphate, mono-sodium phosphate, potassium di-hydrogen phosphate, di-potassium hydrogen phosphate, calcium phosphate, ammonium sodium hydrogen phosphate, magnesium hydrogen phosphate, magnesium phosphate, ferrous phosphate, ferric phosphate, sodium di-hydrogen phosphate, sodium phosphate, di-sodium hydrogen phosphate, lead phosphate, di-ammonium phosphate, calcium di-hydrogen phosphate, lithium phosphate, phospho-tungstic acid, ammonium phospho-tungstate, sodium phospho-tungstate, ammonium phospho-molybdate, sodium phospho-molybdate, sodium phosphite, sodium tripolyphosphate, and sodium pyrophosphate. Among them, preferred are sodium di-hydrogen phosphate, di-sodium hydrogen phosphate, potassium di-hydrogen phosphate and di-potassium hydrogen phosphate.

The combination of the inorganic fluoride compound with the phosphoric acid salt compound is not restricted to any specific one, but the aqueous solution preferably comprises at least sodium fluorozirconate as the inorganic fluorine atom-containing compound and at least sodium di-hydrogen phosphate as the phosphoric acid salt compound.

The concentration of the phosphoric acid salt compound in the aqueous solution is preferably not less than 0.01% by mass and more preferably not less than 0.1% by mass from the viewpoint of the ability of the resulting plate to be developed on a printing machine and the anti-fouling properties of the resulting printing plate, while it is preferably not more than 20% by mass and more preferably not more than 5% by mass from the viewpoint of the solubility thereof in the solution.

The mixing ratio of the compounds in the aqueous solution is not restricted to any specific one, but the ratio (by mass) of the inorganic fluorine atom-containing compound to the phosphoric acid salt compound preferably ranges from 1/200 to 10/1 and more preferably 1/30 to 2/1.

Moreover, the temperature of the aqueous solution is preferably not less than 20° C. and more preferably not less than 40° C., while it is preferably not more than 100° C. and more preferably not more than 80° C.

In addition, the aqueous solution preferably has a pH value of not less than 1 and more preferably not less than 2, while the aqueous solution preferably has a pH value of not more than 11 and more preferably not more than 5.

The method for sealing treatment using an aqueous solution containing an inorganic fluorine atom-containing compound is not limited to any particular one and may be, for instance, a dipping method and a spraying method. These methods may be used alone once or over several times, or they may be used in any combination of at least two of them.

Among these, preferably used herein is a dipping method. When the aluminum plate is treated according to the dipping method, the treating time is preferably not less than one second and more preferably not less than 3 seconds, while it is preferably not more than 100 seconds and more preferably not more than 20 seconds.

<Sealing Treatment with Water Vapor (Steam)>

The sealing treatment with steam may be, for instance, one in which the aluminum plate having an anodized layer formed thereon is continuously or intermittently brought into close contact with pressurized steam or the steam under ordinary pressure.

The temperature of the steam is preferably not less than 80° C. and more preferably not less than 95° C., while it is preferably not more than 105° C.

The pressure of the steam preferably ranges from (atmospheric pressure −50 mmAq) to (atmospheric pressure+300 mmAq) ($1.008 \times 10^5$ to $1.043 \times 10^5$ Pa).

In addition, the contact time is preferably not less than one second and more preferably not less than 3 seconds, while it is preferably not more than 100 seconds and more preferably not more than 20 seconds.

<Sealing Treatment with Hot Water>

The sealing treatment with hot water may be, for instance, one in which the aluminum plate having an anodized layer formed thereon is dipped in hot water.

The hot water used in this treatment may comprise an inorganic salt (such as a phosphoric acid salt) or an organic salt.

The temperature of the hot water is preferably not less than 80° C. and more preferably not less than 95° C., while it is preferably not more than 100° C.

The time required for dipping the plate in hot water is preferably not less than one second and more preferably not less than 3 seconds, while it is preferably not more than 100 seconds and more preferably not more than 20 seconds.

The hydrophilization treatment used in the present invention may be, for instance, the treatment with alkali metal silicates such as those disclosed in U.S. Pat. Nos. 2,714,066, 3,181,461, 3,280,734 and 3,902,734. In this method, the treatment comprises the step of dipping a substrate in an aqueous solution of, for instance, sodium silicate or electrolyzing the substrate in such an aqueous solution. In addition to the foregoing, usable herein include, for instance, a method disclosed in Japanese Examined Patent Publication (hereunder referred to as "J.P. KOKOKU") Sho 36-22063, in which a substrate is treated with potassium fluorozirconate; and methods disclosed in U.S. Pat. Nos. 3,276,868, 4,153,461 and 4,689,272, wherein a substrate is treated with polyvinyl sulfonic acid.

The substrate usable herein preferably has a center line average surface roughness on the order of 0.10 to 1.2 μm. The use of a substrate having such an average surface roughness would permit the achievement of good adhesion to the image-recording layer and the good printing durability and anti-fouling properties of the resulting printing plate.

(2-1-2) Step for Ejecting Ink Composition onto the Foregoing Hydrophilic Substrate When ejecting the ink composition of the present invention onto the surface of the hydrophilized substrate, it is preferred that the ink composition is heated to a temperature ranging from 40 to 80° C., preferably 25 to 30° C., to thus reduce the viscosity of the ink composition to a level on the order of 7 to 30 mPa·sec and preferably 7 to 20 mPa·sec, prior to the ejection. The use of this method would permit the achievement of highly stable ejection of the ink composition. The radiation-curable ink composition such as the ink composition according to the present invention in general has a high viscosity as compared with that observed for the usual water-based ink used as an ink jet-recording ink composition and therefore, the viscosity thereof widely varies in response to the temperature variation encountered during the printing operations. The variation of ink viscosity may greatly affect the size change of ink droplets and the fluctuation in the ejection rate thereof and this in turn results in the deterioration of the image quality. Therefore, the variation of the ink temperature during printing should be controlled to a level as low as possible. Thus, the ink temperature should suitably be controlled so that the variation thereof falls within the following range: the set temperature ±5° C., preferably the set temperature ±2° C. and more preferably the set temperature ±1° C.

(2-1-3) Step for Curing the Ink Ejected on Hydrophilic Substrate by Irradiation Thereof with Radiant Rays The foregoing ink ejected on the surface of the hydrophilic substrate is cured by the irradiation thereof with radiant rays. More specifically, the sensitizing dye included in the polymerization initiator system present in the ink composition of the present invention is activated to its excited state through the absorption of radiant rays, the excited sensitizing dye then comes in close contact with the polymerization initiator present in the system to induce the decomposition of the latter and the polymerizable compound present in the composition thus undergoes radical polymerization to thus cure the ink composition.

The radiant rays used herein may be, for instance, an α-beam, a γ-beam, an electron beam, X-rays, ultraviolet light rays, visible light rays or infrared light rays. The peak wavelength of the radiation may vary depending on the absorption characteristics of each particular sensitizing dye selected, but it preferably ranges from 200 to 600 nm, preferably 300 to 450 nm and more preferably 350 to 450 nm. The polymerization initiator system used in the present invention is sufficiently sensitive even to radiation having a low output. Accordingly, the output of the radiation desirably corresponds to the irradiation energy on the order of, for instance, not more than 2000 mJ/cm$^2$, preferably 10 to 2000 mJ/cm$^2$, more preferably 20 to 1000 mJ/cm$^2$ and further preferably 50 to 800 mJ/cm$^2$. Moreover, in the present invention, the radiant rays are suitably applied at an intensity of illuminance on the exposed surface ranging, for instance, from 10 to 2000 mW/cm$^2$, and preferably 20 to 1000 mW/cm$^2$.

The foregoing ink composition of the present invention is suitably irradiated with such radiant rays, for instance, for 0.01 to 120 seconds and preferably 0.1 to 90 seconds.

The fundamental irradiation method and conditions for irradiating with such radiant rays are disclosed in J.P. KOKAI Sho 60-132767. Specifically, light sources are positioned on both sides of a head unit including an ink-ejection device and the head unit and the light sources are scanned according to the so-called shuttle system to thus irradiate the ink composition. The irradiation with radiant rays is carried out after the elapse of a desired time period (for instance, 0.01 to 0.5 second, preferably 0.01 to 0.3 second and more preferably 0.01 to 0.15 second) from the impact of the ink composition on the substrate.

Any bleeding of the ink composition ejected on the substrate possibly observed prior to the curing of the ink composition can be inhibited by controlling the time elapsed from the impact of the ink till the irradiation with radiant rays to a level as short as possible. Moreover, in case of a porous recording medium, the ink ejected on the substrate can be exposed to radiant rays before the ink penetrates even in such a deeper portion that the light rays from the light sources never reach and therefore, the cured ink composition or the recorded material is almost free of any un-reacted monomer and as a result, the generation of any offensive odor can be suppressed.

Further, the curing of the ink may be completed by the use of a separate light source free of any driving means. WO 99/54415 discloses an irradiation method which makes use of an optical fiber or a method in which a collimated light beam from a light source is incident upon a mirror surface positioned on the side face of the head unit to thus irradiate the recording area with UV light rays.

If using the foregoing ink jet-recording method, the dot diameter of the ink impacted on the surface can be kept constant even when using a variety of recording mediums having different surface wettability and the quality of images can thus be improved. Incidentally, a color image is preferably obtained by superposing colors, in order, from a low lightness one to a higher lightness one. If multiple ink compositions are thus superposed, in order of the magnitude of lightness, the radiant rays are liable to easily reach even the lower ink layers and accordingly, it would be expected to ensure high sensitivity to curing, to reduce the amount of residual monomers, to suppress the generation of any offensive odor and to improve the adhesion. In addition, all of the ink compositions can first be ejected and then comprehensively exposed to light rays, but it is rather preferred to expose each time a color is ejected from the viewpoint of the acceleration of the curing.

The foregoing ink composition of the present invention is thus cured through the irradiation with radiant rays to thus form hydrophobic images on the foregoing hydrophilic substrate surface.

(2-2) Ink Jet-Recording Device

The ink jet-recording device usable in the present invention is not restricted to any particular one and may be any commercially available one. According to the present invention, images can thus be recorded on a recording medium using any commercially available ink jet-recording device.

The ink jet-recording device usable in the present invention comprises, for instance, an ink-supply system, a temperature sensor and a source of radiant rays.

The ink-supply system comprises, for instance, a main tank containing the foregoing ink composition of the present invention, piping works for supply, an ink-supply tank positioned immediately before the ink jet head, a filter, and a piezoelectric ink-ejection head. The piezoelectric ink-ejection head can be operated in such a manner that it can eject multiple-sized dots of 1 to 100 pl, preferably 8 to 30 pl at a resolution of, for instance, 320×320 to 4000×4000 dpi, preferably 400×400 to 1600×1600 dpi and more preferably 720× 720 dpi. In this connection, the unit "dpi" used herein means the number of dots per unit length (one inch (2.54 cm)).

As has been described above, the radiation-curable ink is desirably maintained at a predetermined temperature during the ejection thereof and accordingly, the region extending from the ink-supply tank to the ink jet head portion may be thermally insulated or may be heated. The method for controlling the temperature at this stage is not restricted to any particular one, but it is preferred to arrange a plurality temperature sensors at every piping works to thus heat the system or to control the temperature while taking into consideration the flow rate of ink and the environmental temperature. Temperature sensors may be positioned on the ink-supply tank and at a position in the proximity to the nozzle of the ink jet head. In addition, the head unit to be heated is preferably thermally insulated or thermally shielded so that the main body of the device is never affected by the temperature of the outside air. It is likewise preferred that the heat content of the entire heating unit is reduced and simultaneously it is thermally isolated from other portions to make the printer-rise time required for the heating short or to reduce the loss of heating energy.

The sources of radiant rays principally used include, for instance, a mercury lamp or a gas•solid state laser and there have widely been known the use of, for instance, a mercury lamp or a metal halide lamp in an ultraviolet light-curable ink jet-recording device. However, there has presently been intensively desired for the development of the technique which never uses mercury from the viewpoint of the environmental protection and accordingly, it would be quite effective from the industrial and environmental standpoint to switch over to an UV-emission device made of a GaN type semiconductor. Further, a light-emitting diode (LED, for instance, UV-LED) and a laser diode (LD such as UV-LD) have smaller sizes and a longer service life, can provide a high efficiency and are less expensive and therefore, they have been expected as effective light sources for light-curable ink jet-recording device.

Further, a light-emitting diode (LED) and a laser diode (LD) may be used as sources of radiant rays. In particular, when the use of an ultraviolet source is required, an ultraviolet LED and ultraviolet LD can be used as such light sources. For instance, Nichia Chemical Co., Ltd. has already been put, on the market, an ultraviolet LED whose principal emission spectrum has a wavelength falling within the range of from 365 nm to 420 nm. Moreover, U.S. Pat. No. 6,084,250 discloses an LED device capable of emitting light rays whose wavelength falls within the range of from 300 nm to 370 nm and this source would be effective when light rays having such a shorter wavelength should be used. In addition, other ultraviolet LEDs may likewise be commercially available and radiant rays falling within different ultraviolet regions may be used for the irradiation. The radiation sources particularly preferably used in the present invention are UV-LEDs and particularly preferably those having peak wavelengths ranging from 350 to 420 nm.

EXAMPLES

The present invention will hereunder be described in more detail with reference to the following Examples, but the present invention is not restricted to the embodiments illustrated in these Examples at all.

Example 1

Preparation of Pigment Dispersion

According to the following method, there was prepared each of the following yellow, magenta, cyan and black pigment dispersions 1. In this respect, each dispersion was prepared using a known dispersion device while appropriately adjusting the dispersion conditions in such a manner that the average particle size of each pigment dispersion fell within the range of from 0.2 to 0.3 µm and then filtered through a filter with heating to thus give each corresponding pigment dispersion.

(Yellow Pigment Dispersion 1)

| Component | Amt. (part by mass) |
|---|---|
| C.I. Pigment Yellow 12 | 10 |
| Polymeric dispersant (Solsperse series, available from Zeneca Company) | 5 |
| Stearyl acrylate | 85 |

(Magenta Pigment Dispersion 1)

| Component | Amt. (part by mass) |
|---|---|
| C.I. Pigment Red 57:1 | 15 |
| Polymeric dispersant (Solsperse series, available from Zeneca Company) | 5 |
| Stearyl acrylate | 80 |

(Cyan Pigment Dispersion 1)

| Component | Amt. (part by mass) |
|---|---|
| C.I. Pigment Blue 15:3 | 20 |
| Polymeric dispersant (Solsperse series, available from Zeneca Company) | 5 |
| Stearyl acrylate | 75 |

(Black Pigment Dispersion 1)

| Component | Amt. (part by mass) |
|---|---|
| C.I. Pigment Black 7 | 20 |
| Polymeric dispersant (Solsperse series, available from Zeneca Company) | 5 |
| Stearyl acrylate | 75 |

<<Preparation of Ink>>

An ink having each corresponding color was prepared according to the method described below and using each dispersion 1 prepared above:

(Yellow Ink 1)

| Component | Amt. (part by mass) |
|---|---|
| Yellow Pigment Dispersion 1 | 20 |
| Polymerizable Compound I-1 | 60 |
| 1,6-Hexanediol diacrylate | 10 |
| Caprolactone-modified di-pentaerythritol hexaacrylate | 5 |
| Polymerization Initiator (IRGACURE 184 available from Chiba Specialty Chemicals Company) | 5 |

(Magenta Ink 1)

| Component | Amt. (part by mass) |
|---|---|
| Magenta Pigment Dispersion 1 | 20 |
| Polymerizable Compound I-1 | 60 |
| 1,6-Hexanediol diacrylate | 10 |
| Caprolactone-modified di-pentaerythritol hexaacrylate | 5 |
| Polymerization Initiator (IRGACURE 184 available from Chiba Specialty Chemicals Company) | 5 |

(Cyan Ink 1)

| Component | Amt. (part by mass) |
|---|---|
| Cyan Pigment Dispersion 1 | 15 |
| Polymerizable Compound I-1 | 65 |
| 1,6-Hexanediol diacrylate | 10 |
| Caprolactone-modified di-pentaerythritol hexaacrylate | 5 |
| Polymerization Initiator (IRGACURE 184 available from Chiba Specialty Chemicals Company) | 5 |

(Black Ink 1)

| Component | Amt. (part by mass) |
|---|---|
| Black Pigment Dispersion 1 | 15 |
| Polymerizable Compound I-1 | 65 |
| 1,6-Hexanediol diacrylate | 10 |
| Caprolactone-modified di-pentaerythritol hexaacrylate | 5 |
| Polymerization Initiator (IRGACURE 184 available from Chiba Specialty Chemicals Company) | 5 |

Each of the foregoing formulation having the corresponding color and composition thus prepared was filtered through a filter having an absolute degree of filtration of 2 µm to thus give each intended ink 1 having the corresponding color.

<<Ink Jet-Recording of Images>>

Then, images were recorded on a recording medium using a commercially available ink jet-recording device provided with a piezoelectric ink jet-nozzle. The ink-supply system thereof comprised a main tank, piping works for supply, an ink-supply tank arranged immediately before the ink jet head, a filter, and a piezoelectric ink-ejection head and the region extending from the ink-supply tank to the ink jet head portion was thermally insulated and heated. Temperature sensors were positioned on the ink-supply tank and at a position in the proximity to the nozzle of the ink jet head and the temperature of the device was controlled in such a manner that the nozzle portion was always maintained at a temperature of 70° C.±2° C. The piezoelectric ink-ejection head was operated in such a manner that it could eject multiple-sized dots of 8 to 30 pl at a resolution of 720×720 dpi. After the impact of the ink on the recording medium, UV-A light rays were condensed to an illuminance at the exposed surface of 100 mW/cm$^2$, and the exposure system, the main scanning speed and the frequency of ejection were controlled in such a manner that the irradiation with the light rays was initiated after 0.1 second from the impact of the ink on the medium. Moreover, the exposure time was set at a variety of levels and the exposure energy was applied onto the impacted ink. In this connection, the unit "dpi" used herein means the number of dots per unit length (one inch (2.54 cm)).

The inks each having the corresponding color and prepared above were ejected on a recording medium in the order, black, cyan, magenta and yellow, at the environmental temperature of 25° C. and the irradiation with the ultraviolet rays was carried out every time each ink was applied. In this respect, the total energy exposed per color was evenly set at 300 mJ/cm$^2$, which was the energy required for the complete curing of each color ink till the placed ink completely lost its stickiness through the examination by touch. Each color image was recorded on, as recording mediums, a surface-grained aluminum substrate, a surface-treated transparent twin-screw extruded polypropylene film to which good printability was imparted, a soft polyvinyl chloride film, cast-coated paper, and commercially available regenerated paper and as a result, each image thus obtained had a high resolution and was free of any dot's bleeding. Further, all of the inks were completely free of any strike through even when an image was recorded on wood free paper, the ink was sufficiently cured and the resulting recorded images never gave out bad smells due to the presence of un-reacted monomers. Moreover, the ink recorded on a film was sufficiently flexible, the ink never underwent any cracking even if it was folded and any problem never arose in the Cellotape (registered trade mark)-peel test for the inspection of adhesiveness.

Examples 2 to 5

Preparation of Ink

Magenta inks 2 to 5 were prepared according to the method described below.

(Magenta Ink 2)

| Component | Amt. (part by mass) |
|---|---|
| Magenta Pigment Dispersion 1 | 20 |
| Polymerizable Compound I-2 | 60 |
| Di-functional aromatic urethane acrylate specified below (Molecular weight (Mw): 1500) | 10 |
| Hexa-functional aliphatic urethane acrylate specified below (Mw: 1000) | 5 |
| Polymerization Initiator (IRGACURE 184 available from Chiba Specialty Chemicals Company) | 5 |

(Magenta Ink 3)

| Component | Amt. (part by mass) |
|---|---|
| Magenta Pigment Dispersion 1 | 20 |
| Polymerizable Compound I-4 | 50 |
| Lactone-modified acrylate specified below (Mw: 458) | 20 |
| Hexa-functional aliphatic urethane acrylate specified below (Mw: 1000) | 5 |
| Polymerization Initiator (IRGACURE 184 available from Chiba Specialty Chemicals Company) | 5 |

(Magenta Ink 4)

| Component | Amt. (part by mass) |
|---|---|
| Magenta Pigment Dispersion 1 | 20 |
| Polymerizable Compound I-14 | 70 |
| Hexa-functional aliphatic urethane acrylate specified below (Mw: 1000) | 5 |
| Polymerization Initiator (IRGACURE 184 available from Chiba Specialty Chemicals Company) | 5 |

(Preparation of Magenta Pigment Dispersion 2)

The same procedures used in the preparation of the magenta pigment dispersion 1 described in Example 1 were repeated except for using isobornyl acrylate in place of the stearyl acrylate used in Example 1 to thus obtain a pigment dispersion (magenta pigment dispersion 2).

(Magenta Ink 5)

| Component | Amt. (part by mass) |
|---|---|
| Magenta pigment dispersion 2 | 20 |
| Polymerizable Compound I-16 | 60 |
| Tetramethylol-methane triacrylate | 15 |
| Polymerization Initiator (IRGACURE 184 available from Chiba Specialty Chemicals Company) | 5 |

Comparative Examples 1 to 2

Preparation of Inks

Magenta inks 6 to 7 were prepared according to the following method:

(Magenta Ink 6: Comp. Ex. 1)

| Component | Amt. (part by mass) |
|---|---|
| Magenta pigment dispersion 1 | 20 |
| Triethylene glycol diacrylate | 45 |
| 1,4-Butanediol diacrylate | 30 |
| Polymerization Initiator (IRGACURE 184 available from Chiba Specialty Chemicals Company) | 5 |

| (Magenta Ink 7: Comp. Ex. 2) | |
|---|---|
| Component | Amt. (part by mass) |
| Magenta pigment dispersion 2 | 20 |
| Stearyl acrylate | 60 |
| Di-functional aromatic urethane acrylate specified below (Mw: 1500) | 10 |
| Hexa-functional aliphatic urethane acrylate specified below (Mw: 1000) | 5 |
| Polymerization Initiator (IRGACURE 184 available from Chiba Specialty Chemicals Company) | 5 |

Di-Functional Aromatic Urethane Acrylate

A product obtained by capping the terminal of a condensate (Mw 1500):

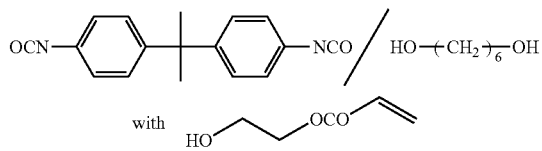

Hexa-Functional Aliphatic Urethane Acrylate

A product obtained by capping the terminal of a condensate (Mw: 1500):

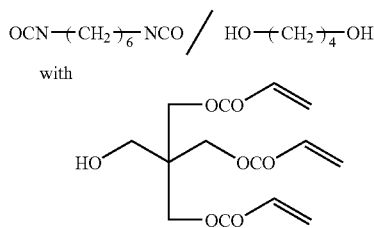

Lactone-Modified acrylate:

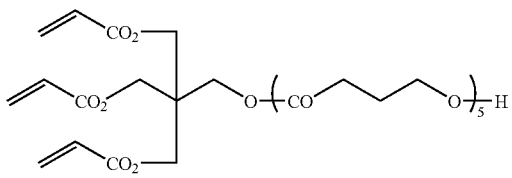

The ink compositions prepared in the foregoing Examples and Comparative Examples were found to have viscosities as determined at the ejection temperature falling within the range of from 7 to 20 mPa·sec.

<<Ink Jet-Recording of Images>>

Magenta images were printed according to the method used in Example 1 using the magenta inks 2 to 7 prepared above and the magenta ink 1 prepared in Example 1.

<<Evaluation of Ink Jet-Recorded Images>>

Then the images thus recorded were inspected for the sensitivity required for curing, the penetrability thereof through commercially available regenerated paper, the ink-bleeding on a surface-grained aluminum substrate, the adhesion, the printing durability of the resulting printing plate and the storage stability, according to the following methods.

(Determination of Sensitivity to Curing)

The quantity of energy (mJ/cm$^2$) applied onto the image-carrying plane irradiated with ultraviolet rays, which was required for curing the ink till it completely lost the stickiness, was herein defined to be the desired sensitivity to curing. In this respect, the smaller the numerical value thus determined, the higher the sensitivity to curing.

(Evaluation of Penetrability Through Commercially Available Regenerated Paper)

The images printed on commercially available regenerated paper were inspected for the ability thereof to pass through the paper and the latter was evaluated on the basis of the following evaluation criteria:

○: There was observed almost no penetration of ink and the image never gave out any smells of the residual monomers.

Δ: There was observed a slight penetration of the ink and the image slightly gave out smells of the residual monomers.

X: There was observed the distinct penetration of the ink even to the back face of the recording medium and the image gave out strong smells of the residual monomers.

(Evaluation of Bleeding of Ink on Surface-Grained Aluminum Substrate)

The images printed on a surface-grained aluminum substrate were inspected for the bleeding thereof on the aluminum substrate and the latter was evaluated on the basis of the following evaluation criteria:

○: There was not observed any bleeding between the neighboring dots.

Δ: There was observed slight bleeding of dots.

X: There was observed bleeding of dots and the images distinctly became dim.

(Evaluation of Adhesion to Surface-Grained Aluminum Substrate)

The foregoing printed images were used as such (defect-free samples) and there were made 11 each of vertical and horizontal cuts on each printed image according to JIS K-5400 to form 100 checkers of 1 mm square and to thus form each corresponding checker pattern-carrying sample. A cellophane tape (Cellotape (registered trade mark)) was adhered to the image-carrying face of each sample, then quickly peeled off at an angle of 90 degrees and the conditions or printed images remained un-remove were evaluated on the basis of the following criteria:

○: There was not observed any peeling off of the printed image even in the checker pattern-cutting (lattice pattern-cutting) test at all.

Δ: There was observed slight peeling off of the printed image in the checker pattern-cutting test, but there was observed almost no peeling off of the printed image on the defect (checker pattern)-free samples.

X: There was observed easy peeling off of the printed image in the both Cellotape-peeling tests carried out using the foregoing defect-free and checker pattern-carrying samples.

(Evaluation of Printing Durability)

The printing plate prepared above by printing images on a surface-grained aluminum substrate was fitted to a Heidel KOR-D printing press and printed matters were prepared by the operation of the printing press to thus determine the number of printed matters carrying complete images and the number of printed matters were relatively compared with one another (the number of the complete printed matters obtained using the sample of Example 3 was defined to be 100) and the results thus obtained were used as the indication of the printing durability. In this respect, the higher the number of the printed matters, the higher the printing durability of the printing plate.

(Evaluation of Storage Stability)

The viscosity of each ink was determined at the ejection temperature after storing the same at 75% RH and 60° C. for 3 days and the increment of the ink viscosity was expressed in terms of the ratio of the viscosity observed after its storage to that observed before its storage. In this connection, if the viscosity is not changed and the ratio is closer to 1.0, the corresponding ink had greater storage stability and it is not preferred to use an ink having a ratio exceeding 1.5, since the ink often causes clogging of the ejection nozzle during the impact of the ink.

The results obtained in these evaluation tests are summarized in the following Table 1.

TABLE 1

|  | Ex. No. | | | | | | |
| --- | --- | --- | --- | --- | --- | --- | --- |
|  | 1 | 2 | 3 | 4 | 5 | 1* | 2* |
| Magenta Ink No. | 1 | 2 | 3 | 4 | 5 | 6 | 7 |
| Sensitivity to curing (mJ/cm²) | 130 | 140 | 150 | 120 | 140 | 200 | 200 |
| Penetrability | ○ | ○ | ○ | ○ | ○ | X | Δ |
| Bleeding of Ink | ○ | ○ | ○ | ○ | ○ | X | Δ |
| Adhesion | ○ | ○ | ○ | ○ | ○ | X | Δ |
| Printing Durability | 120 | 110 | 100 | 120 | 110 | 50 | 80 |
| Storage Stability | 1.1 | 1.1 | 1.2 | 1.2 | 1.1 | 1.6 | 1.5 |

*Comparative Examples

As will be seen from the data listed in Table 1, the ink composition which makes use of the α-hetero atom-containing methacrylic compound according to the present invention is highly sensitive to the irradiation with radiant rays, has a good ability to form images on paper or an ability of forming high quality images thereon and is excellent in the storage stability and further, the ink composition likewise permits the formation of images excellent in the printing durability and the quality thereof even when using the same in the preparation of a printing plate (see, Examples 1 to 5). Contrary to this, the ink composition which makes use of a conventional acrylate compound has a low sensitivity to curing, a high penetrability for paper, and undergoes the bleeding of ink. Further, the latter is inferior in the storage stability and it allows the formation of images having impaired printing durability, although the quality thereof is high when using the same in the preparation of a printing plate.

What is claimed is:

1. An ink jet-recording ink composition comprising (i) a polymerizable α-hetero atom-containing methacrylic compound (a) represented by the following general formula (I), (ii) a polymerization initiator (b) and (iii) a coloring material (c), wherein the ink composition contains a solvent in an amount up to 5% by mass based on the total mass of the ink composition and the surface tension of the ink composition ranges from 20 to 30 mN/m:

wherein, $R^a$ and $R^b$ each independently represent a hydrogen atom, a halogen atom, a cyano group or an organic group; X represents a group bonded to the α-carbon through a hetero atom, or a halogen atom; and $R^c$ represents a secondary or tertiary monovalent hydrocarbon group selected from the group consisting of adamantyl group, noradamantyl group, decalin residue, tricyclodecanyl group, tetracyclo-dodecanyl group, norbornyl group, cedrol group, cycloheptyl group, cyclooctyl group, cyclodecanyl group and cyclododecanyl group, which may additionally comprise a substituent selected from the group consisting of alkyl groups, halogen atoms, hydroxyl group, alkoxy groups, carboxyl groups and alkoxycarbonyl groups, provided that X and $R^c$, $R^a$ and $R^b$, or X and $R^a$ or $R^b$ may be linked together to form a ring structure.

2. The ink jet-recording ink composition as set forth in claim 1, wherein the coloring material (c) is a pigment.

3. An ink jet-recording method comprising the steps of ejecting an ink jet-recording ink composition to place it on a recording medium and irradiating the ink composition with radiant rays to thus make the ink composition cure, said ink jet-recording ink composition comprising (i) a polymerizable α-hetero atom-containing methacrylic compound (a) represented by the following general formula (I), (ii) a polymerization initiator (b) and (iii) a coloring material (c), wherein the ink composition contains a solvent in an amount up to 5% by mass based on the total mass of the ink composition and the surface tension of the ink composition ranges from 20 to 30 mN/m:

wherein, $R^a$ and $R^b$ each independently represent a hydrogen atom, a halogen atom, a cyano group or an organic group; X represents a group bonded to the α-carbon through a hetero atom, or a halogen atom; and $R^c$ represents a secondary or tertiary monovalent hydrocarbon group selected from the group consisting of adamantyl group, noradamantyl group, decalin residue, tricyclodecanyl group, tetracyclo-dodecanyl group, norbornyl group, cedrol group, cycloheptyl group, cyclooctyl group, cyclodecanyl group and cyclododecanyl group, which may additionally comprise a substituent selected from the group consisting of alkyl groups, halogen atoms, hydroxyl group, alkoxy groups, carboxyl groups and alkoxycarbonyl groups, provided that X and $R^c$, $R^a$ and $R^b$, or X and $R^a$ or $R^b$ may be linked together to form a ring structure.

4. A method for the preparation of a lithographic printing plate comprising the steps of ejecting an ink jet-recording ink composition to place it on a hydrophilic substrate and then irradiating the ink composition with radiant rays to thus form a hydrophobic area on the substrate, said ink jet-recording ink composition comprising (i) a polymerizable α-hetero atom-containing methacrylic compound (a) represented by the following general formula (I), (ii) a polymerization initiator (b) and (iii) a coloring material (c), wherein the ink composition contains a solvent in an amount up to 5% by mass based on the total mass of the ink composition and the surface tension of the ink composition ranges from 20 to 30 mN/m:

(I)

wherein, $R^a$ and $R^b$ each independently represent a hydrogen atom, a halogen atom, a cyano group or an organic group; X represents a group bonded to the α-carbon through a hetero atom, or a halogen atom; and $R^c$ represents a secondary or tertiary monovalent hydrocarbon group selected from the group consisting of adamantyl group, noradamantyl group, decalin residue, tricyclodecanyl group, tetracyclo-dodecanyl group, norbornyl group, cedrol group, cycloheptyl group, cyclooctyl group, cyclodecanyl group and cyclododecanyl group, which may additionally comprise a substituent selected from the group consisting of alkyl groups, halogen atoms, hydroxyl group, alkoxy groups, carboxyl groups and alkoxycarbonyl groups, provided that X and $R^c$, $R^a$ and $R^b$, or X and $R^a$ or $R^b$ may be linked together to form a ring structure.

5. The ink-jet recording ink composition as set forth in claim 1, wherein the (i) polymerizable α-hetero atom-containing methacrylic compound (a) is represented by any one of the following general formulas (II), (III-1), (III-2) and (IV), General formula (II)

(II)

wherein $R^{a1}$ and $R^{b1}$ each independently represents a hydrogen atom, a halogen atom, a cyano group or a monovalent organic group; $X^1$ represents a halogen atom or a monovalent group bonded to the α-carbon through a hetero atom; and $R^{c1}$ represents a secondary or tertiary monovalent hydrocarbon group selected from the group consisting of adamantyl group, noradamantyl group, decalin residue, tricyclo-decanyl group, tetracyclo-dodecanyl group, norbornyl group, cedrol group, cycloheptyl group, cyclooctyl group, cyclodecanyl group and cyclododecanyl group, which may additionally comprise a substituent selected from the group consisting of alkyl groups, halogen atoms, hydroxyl group, alkoxy groups, carboxyl groups and alkoxycarbonyl groups, and $X^1$ and $R^{c1}$, $R^{a1}$ and $R^{b1}$, or $X^1$ and $R^{a1}$ or $R^{b1}$ may be linked together to thus form a ring structure, wherein said monovalent group bonded to the α-carbon through a hetero atom for $X^1$ is selected from the group consisting of a hydroxyl group, a hetero ring-containing group (provided that this group is linked at the hetero atom), a substituted oxy group, a mercapto group, a substituted thio group, an amino group, a substituted amino group, a sulfo group, a sulfonate group, a substituted sulfinyl group, a substituted sulfonyl group, a phosphono group, a substituted phosphono group, a phosphonate group, a substituted phosphonate group or a nitro group, wherein said substituted oxy group is selected from the group consisting of alkoxy, aryloxy, acyloxy, carbamoyloxy, N-alkyl-carbamoyloxy, N-aryl-carbamoyloxy, N,N-dialkyl-carbamoyloxy, N,N-diaryl-carbamoyloxy, N-alkyl-N-aryl-carbamoyloxy, alkylsulfoxy, arylsulfoxy, phosphono-oxy and phosphonato-oxy groups, General formulas (III-1) and (III-2)

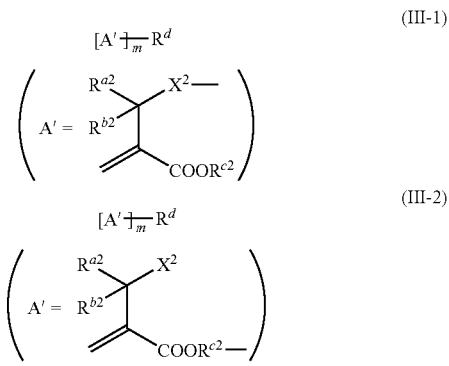

wherein m represents an integer ranging from 2 to 6, $R^{a2}$ and $R^{b2}$ each independently represents a hydrogen atom, a halogen atom, a cyano group or a monovalent organic group; $X^2$ represents a divalent hetero atom, or a monovalent or divalent group bonded to the α-carbon through a hetero atom, or a halogen atom; $R^{c2}$ represents a secondary or tertiary monovalent hydrocarbon group selected from the group consisting of adamantly adamantyl group, noradamantyl group, decalin residue, tricyclo-decanyl group, tetracyclo-dodecanyl group, norbornyl group, cedrol group, cycloheptyl group, cyclooctyl group, cyclodecanyl group and cyclododecanyl group, which may additionally comprise a substituent selected from the group consisting of alkyl groups, halogen atoms, hydroxyl group, alkoxy groups, carboxyl groups and alkoxycarbonyl groups; and $R^d$ represents a divalent to hexavalent hydrocarbon group, provided that at least one of $X^2$ and $R^{c2}$ represents a divalent group, the number of valences present in the structure of Formulas (III-1) and (III-2) ranges from 2 to 6 in total, and $X^2$ and $R^{c2}$, $R^{a2}$ and $R^{b2}$, or $X^2$ and $R^{a2}$ or $R^{b2}$ may be linked together to thus form a ring structure, wherein $R^d$ in formula (III-1) is a member selected from the group consisting of:

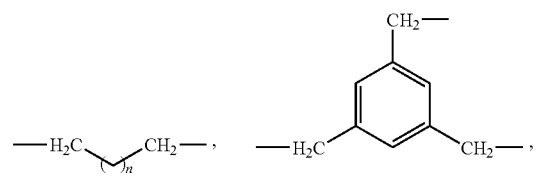

-continued

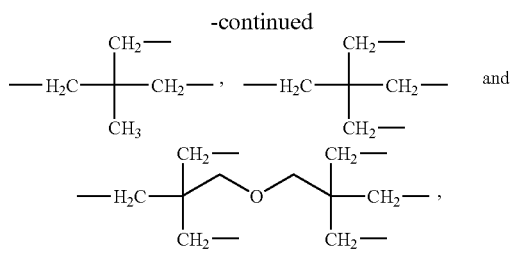
and and wherein $R^d$ in formula (III-2) is a member selected from the group consisting of:

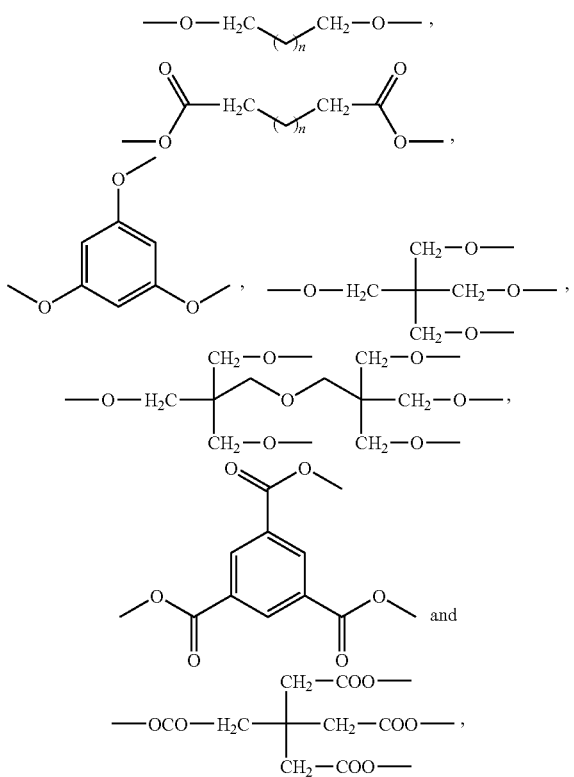

General formula (IV)

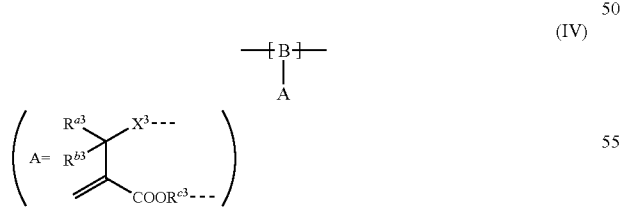

wherein B represents a repeating unit of a polymer chain, and in Formula A, $R^{a3}$ and $R^{b3}$ each independently represents a hydrogen atom, a halogen atom, a cyano group or a monovalent organic group; $X^3$ represents a halogen atom, or a monovalent group or divalent group bonded to the α-carbon through a hetero atom, or a divalent hetero atom; and $R^{c3}$ represents a secondary or tertiary monovalent hydrocarbon group selected from the group consisting of adamantly adamantyl group, noradamantyl group, decalin residue, tricyclo-decanyl group, tetracyclo-dodecanyl group, norbornyl group, cedrol group, cycloheptyl group, cyclooctyl group, cyclodecanyl group and cyclododecanyl group, which may additionally comprise a substituent selected from the group consisting of alkyl groups, halogen atoms, hydroxyl group, alkoxy groups, carboxyl groups and alkoxycarbonyl groups, provided that at least one of $X^3$ and $R^{c3}$ represents a divalent group, the dotted line represents a number of valences which may vary depending on the valence numbers of $X^3$ and $R^{c3}$ and $R^d$, and $X^3$ and $R^{c3}$, $R^{a3}$ and $R^{b3}$, or $X^3$ and $R^{a3}$ or $R^{b3}$ may be linked together to thus form a ring structure.

6. The ink jet recording ink composition as set forth in claim 5, wherein the compounds having the structures represented by the general formulas (II) to (IV) are selected from the group consisting of the following compounds I-1 to I-19, I-22 and I-25 to I-28 having the following structures:

I-1
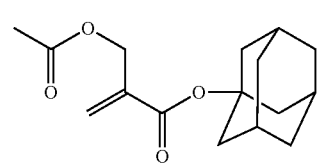

I-2
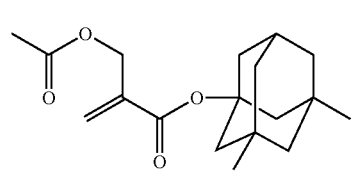

I-3
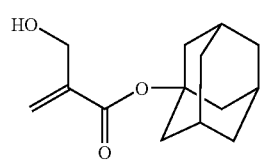

I-4
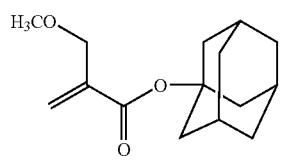

I-5
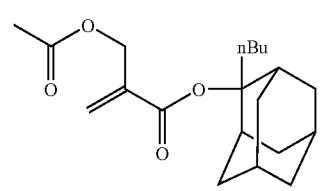

I-6
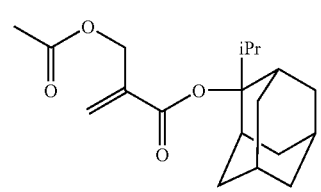

-continued
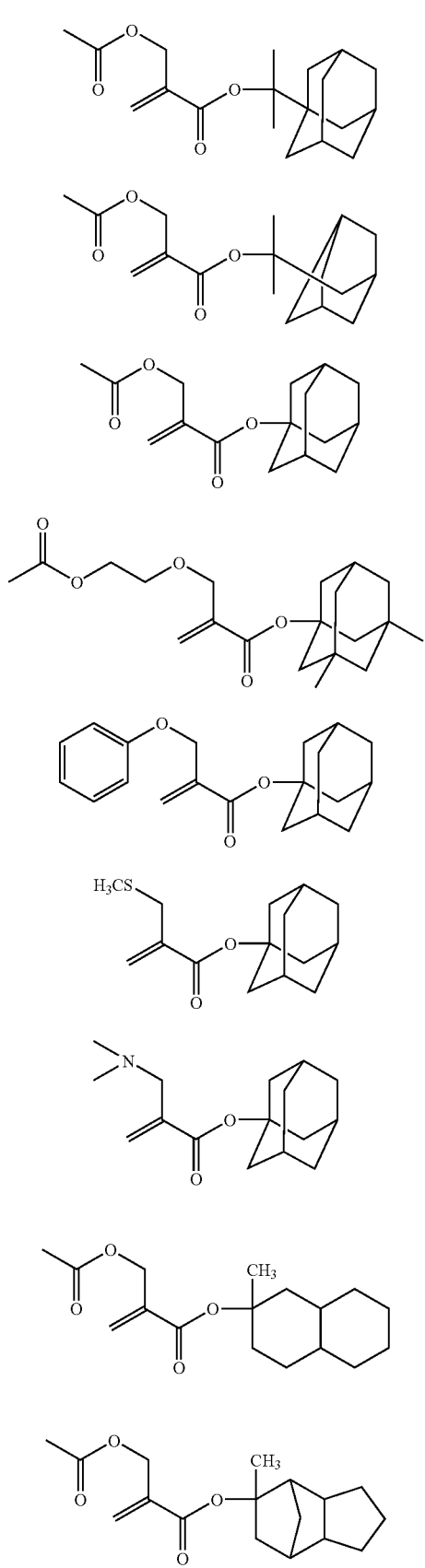
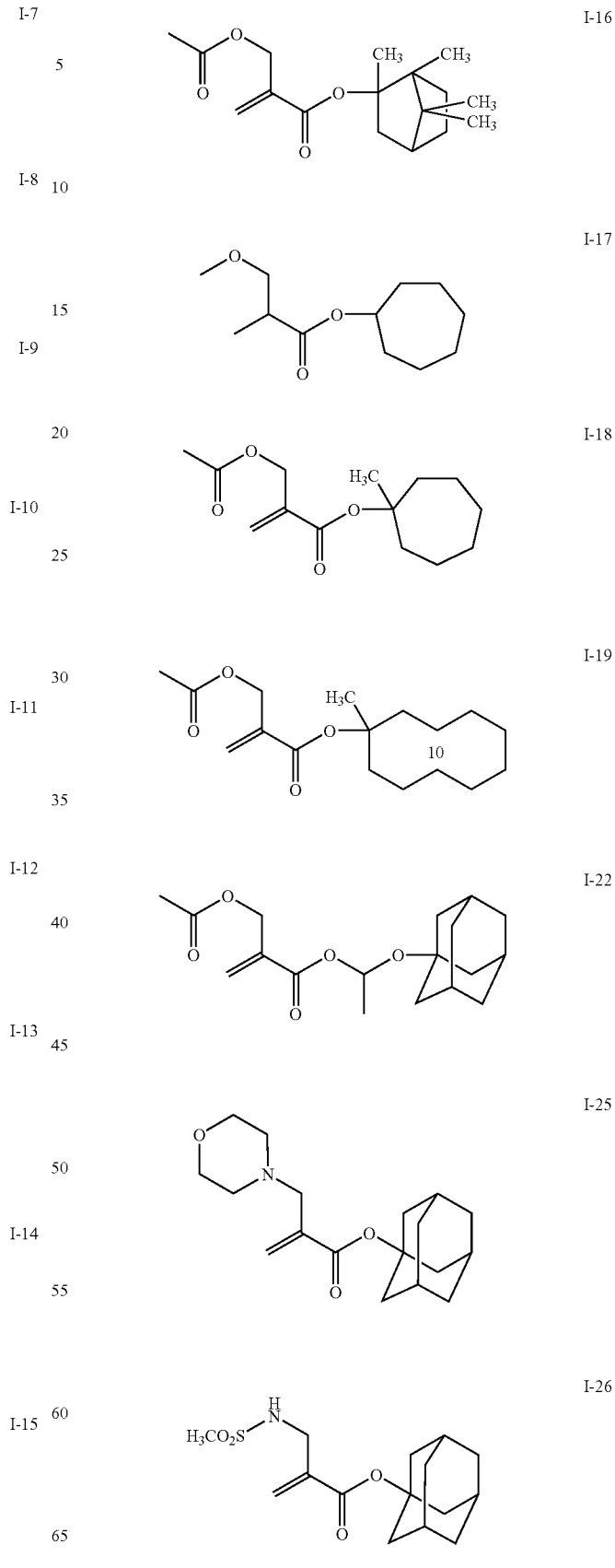

-continued
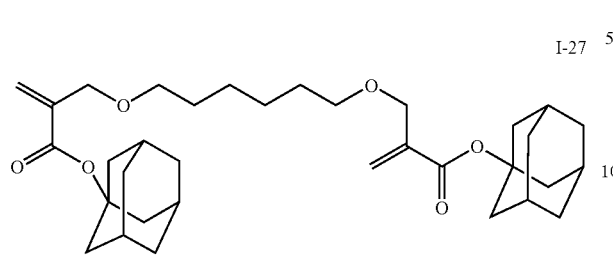
I-27
-continued
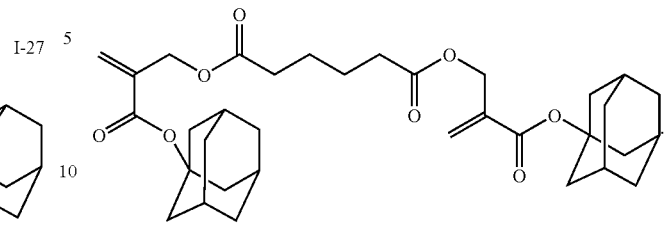
I-28
* * * * *